US012645332B2

(12) United States Patent
Chen et al.

(10) Patent No.: US 12,645,332 B2
(45) Date of Patent: Jun. 2, 2026

(54) TOUCH PANEL AND TOUCH DISPLAY DEVICE

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventors: Cai Chen, Guangzhou (CN); Yan Zhao, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 0 days.

(21) Appl. No.: 18/919,388

(22) Filed: Oct. 17, 2024

(65) Prior Publication Data

US 2025/0044905 A1 Feb. 6, 2025

Related U.S. Application Data

(63) Continuation of application No. PCT/CN2023/106683, filed on Jul. 11, 2023.

(30) Foreign Application Priority Data

Jul. 11, 2022 (CN) .......................... 202210814037.2
Apr. 26, 2023 (CN) .......................... 202310471333.1

(51) Int. Cl.
*G06F 3/044* (2006.01)

(52) U.S. Cl.
CPC .......... *G06F 3/0446* (2019.05); *G06F 3/0443* (2019.05); *G06F 3/0448* (2019.05)

(58) Field of Classification Search
CPC ...... G06F 3/044; G06F 3/0446; G06F 3/0443; G06F 3/0448; G06F 2203/04103; G06F 3/0412; G06F 3/041
See application file for complete search history.

(56) References Cited

U.S. PATENT DOCUMENTS

2010/0007621 A1* 1/2010 Kang .................... G06F 3/0445
345/173
2015/0015532 A1* 1/2015 Choung ................ G06F 3/0446
345/174

(Continued)

OTHER PUBLICATIONS

European Search Report issued in European application No. 23838918.3, mailed Aug. 4, 2025, 9 pages.

*Primary Examiner* — Md Saiful A Siddiqui
(74) *Attorney, Agent, or Firm* — BAYES PLLC

(57) ABSTRACT

A touch panel and a touch display device are provided. The touch panel includes an electrode layer. The electrode layer includes: a plurality of conducting regions arranged in parallel and at intervals; a non-conducting region located between adjacent conducting regions, where the non-conducting region includes an edge region close to a conducting region and a central region far away from the conducting region, and the edge region is adjacent to the central region; and a plurality of suspending blocks located in the non-conducting region, where cutting grooves are provided between the suspending block close to the conducting region and the conducting region, and between adjacent suspending blocks, and a density of the cutting grooves located in the edge region is greater than that of the cutting grooves located in the central region.

20 Claims, 19 Drawing Sheets

(56)                References Cited

U.S. PATENT DOCUMENTS

| | | | | |
|---|---|---|---|---|
| 2015/0115254 A1* | 4/2015 | Choi | ..................... | G06F 3/0412 |
| | | | | 257/40 |
| 2016/0048248 A1* | 2/2016 | Na | .......................... | G06F 3/047 |
| | | | | 345/174 |
| 2017/0322670 A1* | 11/2017 | Wang | ..................... | G06F 3/041 |
| 2017/0364175 A1* | 12/2017 | Park | ..................... | G06F 3/0445 |
| 2021/0325999 A1* | 10/2021 | Liu | ....................... | G06F 3/0446 |
| 2022/0147186 A1* | 5/2022 | Bo | ........................ | G06F 3/0443 |
| 2024/0220060 A1 | 7/2024 | Wang et al. | | |

* cited by examiner

TOUCH PANEL AND TOUCH DISPLAY DEVICE

CROSS-REFERENCE TO RELATED APPLICATIONS

The present disclosure is a continuation of International Application No. PCT/CN2023/106683, filed on Jul. 11, 2023, which claims the priority to a Chinese Patent Application No. 202210814037.2, filed on Jul. 11, 2022, and the priority to a Chinese Patent Application No. 202310471333.1, filed on Apr. 26, 2023. The entire contents of each of the above-identified applications are expressly incorporated herein by reference.

TECHNICAL FIELD

The present disclosure relates to the technical field of touch panels, and in particular to a touch panel and a touch display device.

TECHNICAL BACKGROUND

The electrode layer in the touch panel includes several conducting regions and non-conducting regions located between adjacent conducting regions. Usually, photolithography or laser cutting is used to prepare the electrode layer after depositing the entire surface of conducting materials (such as nanosilver, indium tin oxide, etc.). The photolithography process is to remove all the conducting material in a non-conducting region, leaving only the conducting material in the conducting region. As compared with the photolithography process, the laser cutting process does not require a mask, so it has better flexibility and lower processing costs.

SUMMARY

Therefore, the technical problem to be solved by the present disclosure is how to improve touch effect of a touch panel, and thereby provide a touch panel and a touch display device.

According to an embodiment of the present disclosure, a touch panel is provided, which includes an electrode layer. The electrode layer includes: a plurality of conducting regions arranged in parallel and at intervals; a non-conducting region located between adjacent conducting regions, where the non-conducting region includes an edge region close to a conducting region and a central region far away from the conducting region, and the edge region is adjacent to the central region; and a plurality of suspending blocks located in the non-conducting region, where cutting grooves are provided between the suspending block close to the conducting region and the conducting region, and between adjacent suspending blocks, and a density of the cutting grooves located in the edge region is greater than that of the cutting grooves located in the central region.

In some implementations, the non-conducting region includes a plurality of identical non-conducting sub-regions successively connected along an extension direction of the non-conducting region, and the conducting region includes a plurality of identical conducting sub-regions successively connected along an extension direction of the conducting region. The non-conducting sub-region is composed of a region surrounded by at least one conducting sub-region in one conducting region and at least one conducting sub-region in an adjacent conducting region, and a spacing between adjacent cutting grooves gradually increases from the edge of the non-conducting sub-region to the center of the non-conducting sub-region.

In some implementations, from the edge of the non-conducting sub-region to the center of the non-conducting sub-region, the spacing between adjacent cutting grooves is successively enlarged in equal proportion or equal difference.

In some implementations, the cutting groove is parallel to at least one edge of the conducting sub-region.

In some implementations, the conducting sub-region includes an electrode block and a connecting part, and a direction from the electrode block to the connecting part is parallel to an extension direction of the conducting region, and the electrode blocks in two adjacent conducting sub-regions are connected through the connecting part, the cutting groove is parallel to the edge of the electrode block, and a shape of the electrode block includes a rhombus or a triangle; or, the conducting sub-region is rectangular, and the conducting region and the non-conducting region are strip-shaped, and the cutting grooves are parallel to the edges of the conducting regions.

In some implementations, a plurality of the suspending blocks located in each non-conducting sub-region are symmetrically distributed with respect to the center of the non-conducting sub-region.

In some implementations, the cutting groove has a width of 20 μm-60 μm.

In some implementations, the touch panel includes a top electrode close to the touch-sensitive surface and a bottom electrode facing away from the touch-sensitive surface, and the electrode layer is the top electrode or the bottom electrode.

In some implementations, the touch panel includes a top electrode close to the touch-sensitive surface and a bottom electrode facing away from the touch-sensitive surface, and the electrode layer is the top electrode and the bottom electrode.

In some implementations, the touch panel further includes a display module located on a side of the bottom electrode away from the top electrode, the touch panel includes a central region and an edge region located on the periphery of the central region, the edge region is adjacent to the central region, and a density of the cutting grooves of the bottom electrode located in the edge region is smaller than that of the cutting grooves of the bottom electrode located in the central region.

In some implementations, the touch panel further includes a display module located on a side of the bottom electrode away from the top electrode, the touch panel includes a central region and an edge region located on the periphery of the central region, the edge region is adjacent to the central region, the bottom electrode is a sensing electrode layer, a density of the cutting grooves of the bottom electrode located in the edge region is smaller than that of the cutting grooves of the top electrode located in the edge region, and the density of the cutting grooves of the bottom electrode located in the central region is less than that of the cutting grooves of the top electrode located in the central region.

According to an embodiment of the present disclosure, a touch panel is further provided, which includes an electrode layer. The electrode layer includes: a plurality of conducting regions arranged in parallel and at intervals; a non-conducting region located between adjacent conducting regions, where the non-conducting region includes an edge region close to a conducting region and a central region far from the conducting region, and the edge region is adjacent to the central region; and a plurality of suspending blocks located in the non-conducting region, where cutting grooves are provided between the suspending block close to the conducting region and the conducting region, and between adjacent suspending blocks, and an average width of the cutting grooves located in the edge region is greater than that of the cutting grooves located in the central region; and in a unit area, an area of the cutting groove located in the edge region is greater than that of the cutting groove located in the central region.

According to an embodiment of the present disclosure, a touch panel is further provided, which includes an electrode layer. The electrode layer includes: a plurality of conducting regions arranged in parallel and at intervals; a non-conducting region located between adjacent conducting regions, where the non-conducting region includes an edge region close to a conducting region and a central region far from the conducting region, and the edge region is adjacent to the central region; and a plurality of suspending blocks located in the non-conducting region, where cutting grooves are provided between the suspending block close to the conducting region and the conducting region, and between adjacent suspending blocks, a width of the cutting groove located in the edge region is less than or equal to that of the cutting groove located in the central region; and in a unit area, the number of suspending blocks in the edge region is greater than that in the central region, and in a unit area, an area of the cutting groove in the edge region is greater than that in the central region.

According to an embodiment of the present disclosure, a touch panel is further provided, which includes an electrode layer. The electrode layer includes: a plurality of conducting regions arranged in parallel and at intervals; a non-conducting region located between adjacent conducting regions, where the non-conducting region includes an edge region close to a conducting region and a central region far from the conducting region, and the edge region is adjacent to the central region; and a plurality of suspending blocks located in the non-conducting region, where cutting grooves are provided between the suspending block close to the conducting region and the conducting region, and between adjacent suspending blocks, and an average width of the cutting groove located in the edge region is greater than that of the cutting groove located in the central region.

According to an embodiment of the present disclosure, a touch display device is further provided, which includes any of the above-mentioned touch panels.

BRIEF DESCRIPTION OF DRAWINGS

In order to explain the specific embodiments of the present disclosure or the technical solutions in the related art, the drawings that need to be used in the description of the specific embodiments or the related art will be briefly introduced below. The drawings in the following description illustrate some embodiments of the present disclosure. For those skilled in the art, other drawings may be obtained based on these drawings without exerting creative efforts.

REFERENCE SYMBOLS

Figure 1:
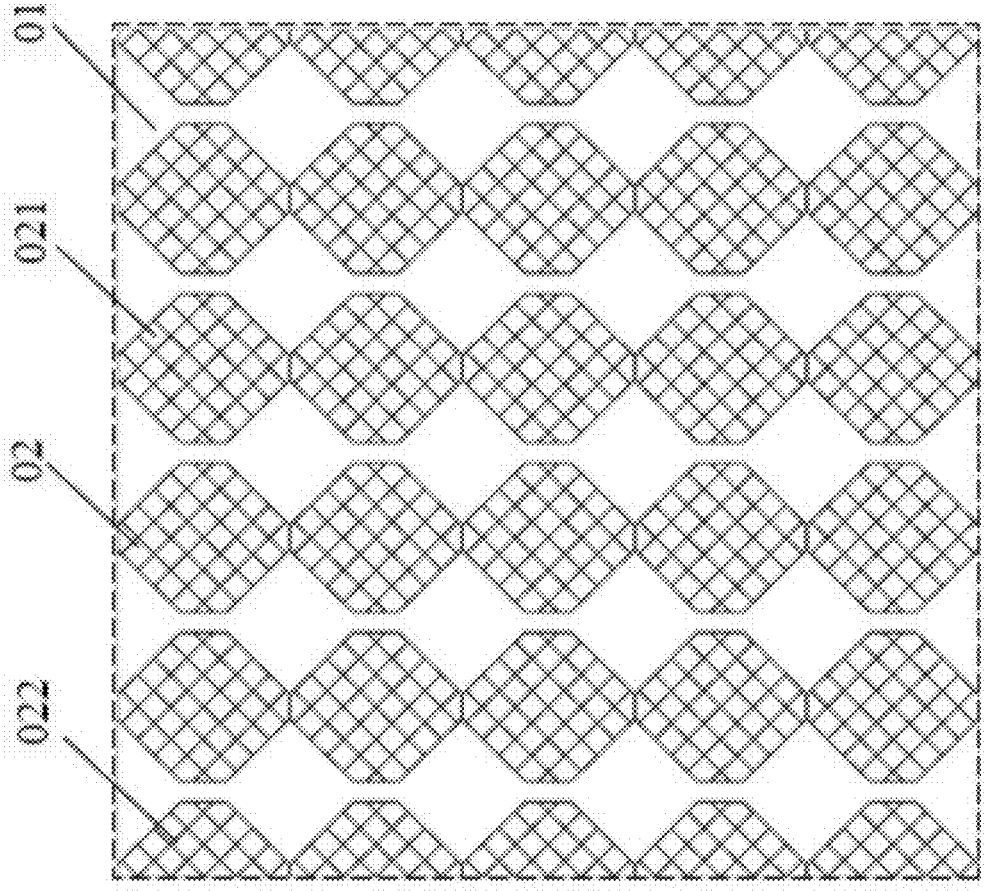
FIG. 1 is a schematic diagram of a partial structure of an electrode layer.

0—electrode layer; 01—conducting region; 02—non-conducting region; 021—suspending block; 022—cutting groove; 1—electrode layer; 11—conducting region; 111—electrode block; 112—connecting part; 12—non-conducting region; 121—non-conducting sub-region; 122—suspending block; 123—cutting groove; 1'—electrode layer; 11'—conducting region; 111'—electrode block; 112'—connecting part; 12'—non-conducting region; 121'—non-conducting sub-region; 122'—suspending block; 123'—cutting groove; 2—display module; 3—first adhesive layer; 4—bottom substrate layer; 5—bottom electrode; 51—bottom electrode block; 52—first bottom cutting groove; 53—second bottom cutting groove; 5'—bottom electrode; 51'—bottom electrode block; 6—second adhesive layer; 7—top substrate layer; 8—top electrode; 81—top electrode block; 8'—top electrode; 81'—top electrode block; 9—third adhesive layer; 10—cover plate, 20—first adhesive layer; 30—top substrate layer; 31—top conducting region; 311—top electrode block; 312—top connecting part; 40—second adhesive layer; 50—bottom substrate layer; 51—bottom conducting region; 511—bottom electrode block; 512—bottom connecting part; 513—non-conducting region; 513*a*—edge region; 513*b*—central region; 514—cutting groove; 514*a*—edge cutting groove; 514*b*—center cutting groove; 60—third adhesive layer; 70—display module.

DETAILED DESCRIPTION

The technical solution of the present disclosure will be described below with reference to the accompanying drawings. The described embodiments are part of the embodiments of the present disclosure, rather than all the embodiments. Based on the embodiments of the present disclosure, all other embodiments obtained by those skilled in the art without creative efforts fall within the scope of protection of the present disclosure.

In the description of the present disclosure, it should be noted that the orientation or positional relationship indicated by the terms "upper," "lower," "inner," "outer," etc. are based on the orientation or positional relationship shown in the drawings, which is only intended to facilitate the description of the present disclosure and simplify the description, and is not intended to indicate or imply that the device or element referred to must have a specific orientation, be constructed and operated in a specific orientation, and therefore cannot be construed as a limitation of the present disclosure. In addition, the terms "first" and "second" are used for descriptive purposes only and are not to be understood as indicating or implying relative importance.

In addition, the technical features involved in different embodiments of the present disclosure described below may be combined with each other as long as they do not conflict with each other.

Referring to FIG. 1, the laser cutting process is to cut the entire surface of the conducting material to separate the conducting material in the non-conducting region 02 from the conducting material in the conducting region 01, and cut the conducting material in the non-conducting region 02 at equal intervals to obtain several suspending blocks 021 and cutting grooves 022 between adjacent suspending blocks 021, thereby obtaining the electrode layer 0. As compared with the photolithography process, the laser cutting process does not require a mask, so it has better flexibility and lower processing costs.

However, electric potentials on a single suspending block are equal, which causes the distribution of electric field lines to be affected, thereby reducing the signal quality during the touch process and limiting the touch effect of the touch panel. It can be seen that the method of preparing the electrode layer by laser cutting process needs to be improved.

In the laser etching process, the non-conducting region includes a plurality of suspending blocks, and a potential on a single suspending block is equal, causing the distribution of electric field lines to be affected. Simulation and experimental results prove that the electric field lines in the touch panel are not uniformly distributed, and a density of the electric field lines in the region close to the conducting region is greater than that of the electric field lines in the region far away from the conducting region. However, in some equidistant laser cutting manners, the distribution of the cutting grooves does not match the distribution of the electric field lines, thereby reducing the signal quality during the touch process, resulting in a limited touch effect of the touch panel.

Based on this, according to an embodiment of the present disclosure, a touch panel is provided, which includes an electrode layer. The electrode layer includes: a plurality of conducting regions arranged in parallel and at intervals; a non-conducting region located between adjacent conducting regions, where the non-conducting region includes an edge region close to a conducting region and a central region far away from the conducting region, the edge region is adjacent to the central region; a plurality of suspending blocks located in the non-conducting region, where cutting grooves are provided between the suspending block close to the conducting region and the conducting region, and between adjacent suspending blocks, and a density of the cutting grooves located in the edge region is greater than that of the cutting grooves located in the central region.

The above-mentioned touch panel utilizes the principle that the density of electric field lines in the edge region close to the conducting region in the non-conducting region is greater than that of the electric field lines in the central region far away from the conducting region. The density of the cutting grooves is greater than that of the cutting grooves located in the central region, so that the distribution of the cutting grooves matches the distribution of the electric field lines, which improves the distribution of the electric field lines, and thereby increasing the signal quality in the touch process to a certain extent. Better touch effects may provide better touch effects, including improved accuracy, linearity separation, and other indicators.

It should be noted that in order to improve the distribution of electric field lines, the number of cuttings on the basis of equidistant cutting increases so that the number of cutting grooves increases. When the width of the cutting grooves of this embodiment is the same as that of the related art, this embodiment can achieve the same effect as the related art with fewer cutting grooves, which reduces the number of cutting grooves and is conducive to reducing the processing cost and processing time of the touch panel; furthermore, laser cutting has the risk of damaging the substrate layer, so reducing the number of laser cutting is conducive to improving the yield of the touch panel. In other words, when the number of cutting grooves in this embodiment is the same as the number of cutting grooves in the related art, and the width of the cutting grooves in this embodiment is also the same as the width of the cutting grooves in the related art, the control effect of this embodiment is better, so that passive pens with smaller pen tips and thicker covers may be adapted, which is beneficial to improving user experience.

Figure 2:
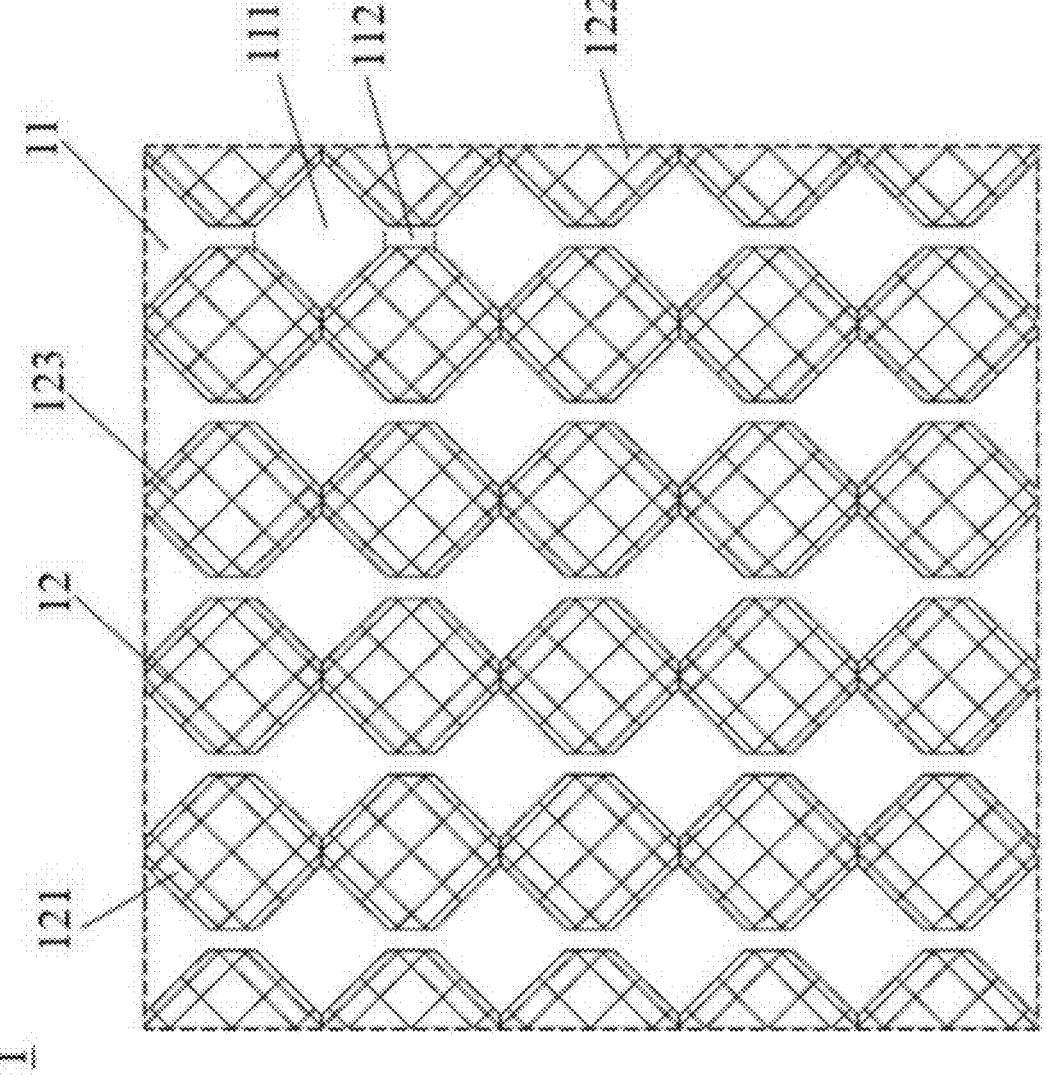
FIG. 2 is a schematic diagram of a partial structure of an electrode layer according to an embodiment of the present disclosure.

In some implementations, referring to FIG. 2, in the electrode layer 1, a non-conducting region 12 includes a plurality of identical non-conducting sub-regions 121 successively connected along an extension direction of the non-conducting region 12, and a conducting region 11 includes a plurality of identical conducting sub-regions successively connected along an extension direction of the conducting region 11. A non-conducting sub-region 121 is composed of a region surrounded by at least one conducting sub-region in one conducting region 11 and at least one conducting sub-region in an adjacent conducting region 11. A spacing between adjacent cutting grooves 123 gradually increases from the edge of the non-conducting sub-region 121 to the center of the non-conducting sub-region 121. For example, from the edge of the non-conducting sub-region 121 to the center of the non-conducting sub-region 121, the spacing between adjacent cutting grooves 123 is enlarged in equal proportions or equal differences. It should be understood that the spacing between adjacent cutting grooves 123 may be fine-tuned as long as satisfying the above numerical relationship. When the electric field line distribution exhibits exponential attenuation, from the edge of the non-conducting sub-region 121 to the center of the non-conducting sub-region 121, the spacing between adjacent cutting grooves 123 is enlarged in equal proportions in sequence. It should be understood that the electrode layer includes, but is not limited to, the structure of the electrode layer shown in FIG. 2.

Furthermore, a cutting groove is parallel to at least one edge of the conducting sub-region. In some implementations, the cutting grooves include, but are not limited to, linear grooves. When the cutting grooves are linear grooves, a plurality of cutting grooves in the same non-conducting sub-region may extend in the same direction, or may extend in multiple directions, and may be designed based on the shape of the non-conducting sub-region. Furthermore, the number of cutting grooves located in the same non-conducting sub-region and having the same extending direction may be 5, 6, 7 or other numbers. It should be understood that during design or preparation, the shape and position of the cutting grooves may be fine-tuned so that the cutting grooves are not completely parallel to the edge of the conducting sub-region.

Furthermore, the width of the cutting grooves may be determined based on the actual cutting process capability. In an embodiment, the width of a cutting groove is 20 μm-60 μm. For example, the width of the cutting groove may be 20 μm, 25 μm, 30 μm, 35 μm, 40 μm, 45 μm, 50 μm, 55 μm, or 60 μm. It should be understood that the widths of a plurality of cutting grooves in a non-conducting region or even in an electrode layer may be the same or different, and the densities of cutting grooves located at different positions of the same electrode layer may be the same or different.

In an embodiment, a non-conducting sub-region has at least one central axis parallel to an edge of the conducting sub-region. When the cutting groove is a straight groove, the cutting groove is parallel to at least one central axis, and a cutting groove is formed at the central axis of the non-conducting sub-region, from the edge of the non-conducting sub-region to the central axis of the non-conducting sub-region. The spacing between adjacent cutting grooves gradually increases along the central axis of the non-conducting sub-region. For example, from the edge of the non-conducting sub-region to the central axis of the non-conducting sub-region, the spacing between adjacent cutting grooves is enlarged in equal proportions or equal differences in sequence. It should be understood that the distribution of the cutting grooves located on both sides of the central axis may be the same or different. In some implementations, the distribution of the cutting grooves located on both sides of the central axis is the same, that is, the cutting grooves in the non-conducting region are symmetrically distributed with respect to the central axis. In some implementations, the cutting grooves are distributed symmetrically about the center of the non-conducting sub-region to facilitate processing. In other embodiments, the non-conducting sub-region may not have a central axis.

In an embodiment, a conducting sub-region is rectangular, and a plurality of conducting sub-regions is successively connected to form a strip-shaped conducting region. The non-conducting region located between adjacent conducting regions is also strip-shaped. The conducting region has an axis of symmetry parallel to the edge of the conducting region, and the cutting groove is parallel to the edge of the conducting region. It should be understood that a plurality of conducting regions may be connected as one.

In another embodiment, a conducting sub-region includes an electrode block and a connecting part. The direction from the electrode block to the connecting part in the conducting sub-region is parallel to the extension direction of the conducting region. The electrode blocks of two adjacent conducting sub-regions in the conducting region are connected through the connecting part, and the region surrounded by two electrode blocks in one conducting region and two electrode blocks in an adjacent conducting region constitutes a non-conducting sub-region. The cutting grooves in the non-conducting sub-region are parallel to the edges of the electrode blocks.

Furthermore, the shape of the electrode block includes, but is not limited to, rhombus and triangle, and the shape of the connecting part is a rectangle.

Figure 3:
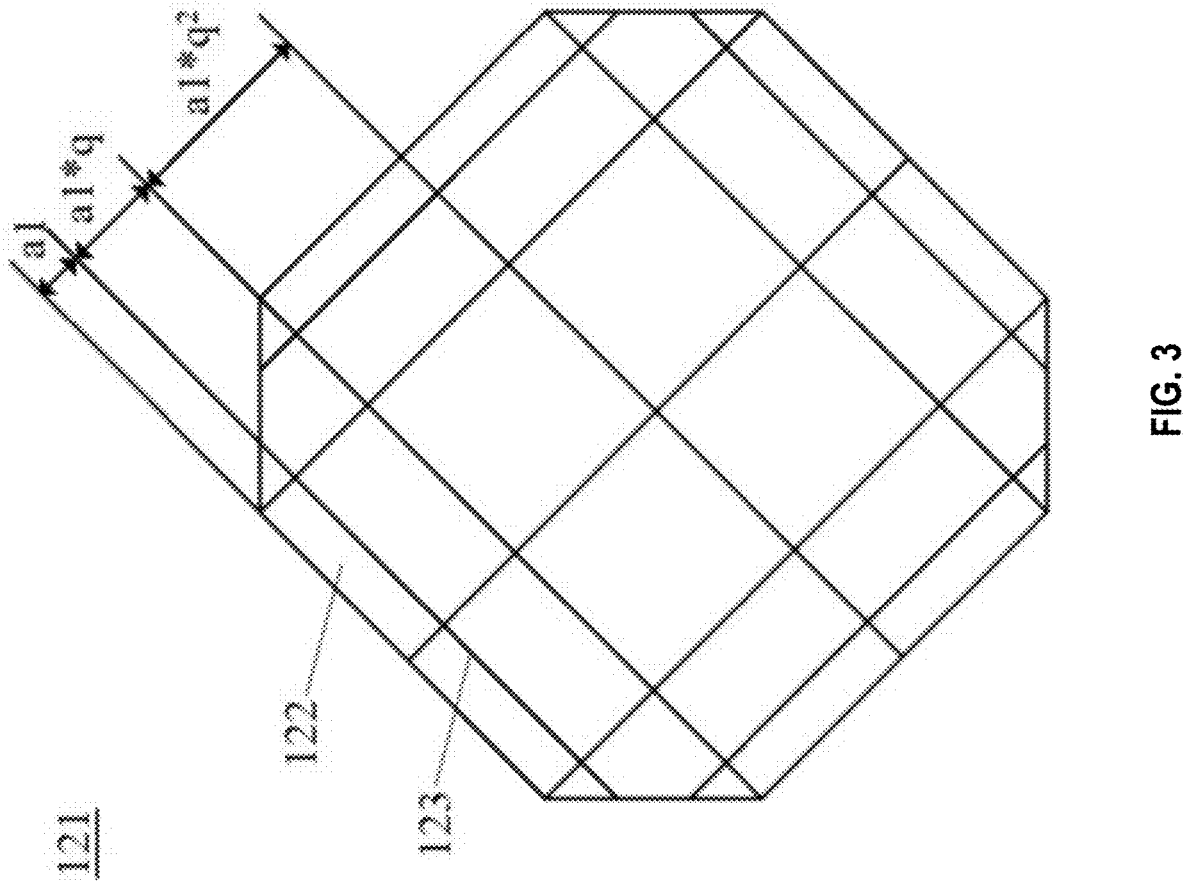
FIG. 3 is a partial enlarged view of a non-conducting region in FIG. 2.

Referring to FIGS. 2 and 3, when the shape of an electrode block 111 in the electrode layer 1 is rhombus, a connecting part 112 connects the corners of the electrode block 111, the shape of the non-conducting sub-region 121 is octagonal, and the non-conducting sub-region 121 has two central axes parallel to the edge of the electrode block. When the cutting grooves 123 are straight grooves, the cutting grooves 123 located in the non-conducting sub-region 121 include a plurality of first cutting grooves and a plurality of second cutting grooves. The first cutting grooves and the second cutting grooves are respectively parallel to the two edges where the electrode block intersects, and a plurality of first cutting grooves and a plurality of second cutting grooves intersect to form a plurality of diamond-shaped suspending blocks 122. It should be understood that the change rule of the spacing of the first cutting grooves and the change rule of the spacing of the second cutting grooves may be different, or may be the same. In some implementations, the change rule of the spacing of the first cutting grooves is the same as the change rule of the spacing of the second cutting grooves, so that a plurality of the suspending blocks located in the non-conducting sub-region are distributed centrosymmetrically. In FIG. 3, the spacing between adjacent first cutting grooves and the spacing between adjacent second cutting grooves both satisfy an equal ratio relationship, and the common ratio q is greater than 1.

Figure 4:
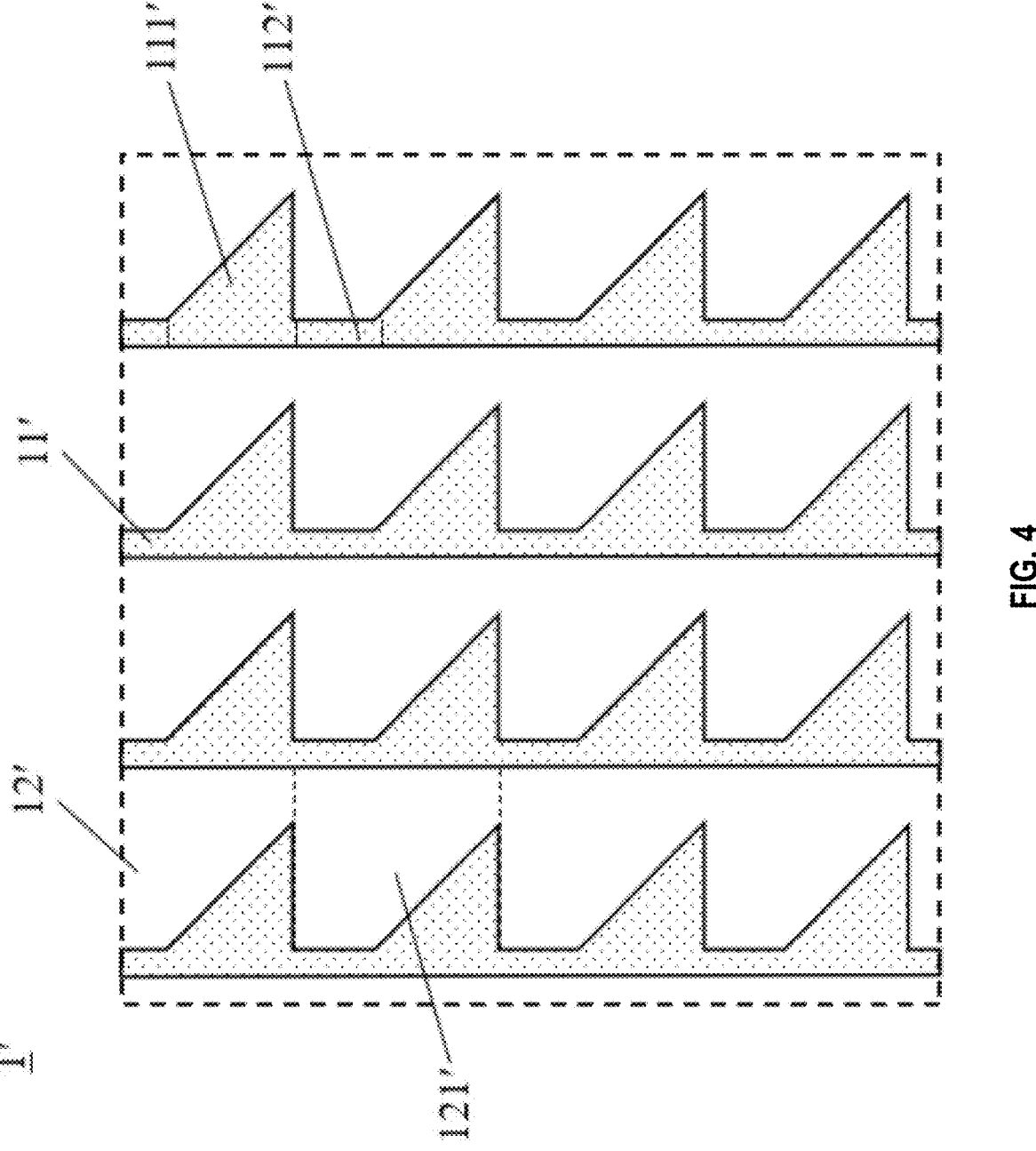
FIG. 4 is a partial structural schematic diagram of another electrode layer according to an embodiment of the present disclosure.
Figure 5:
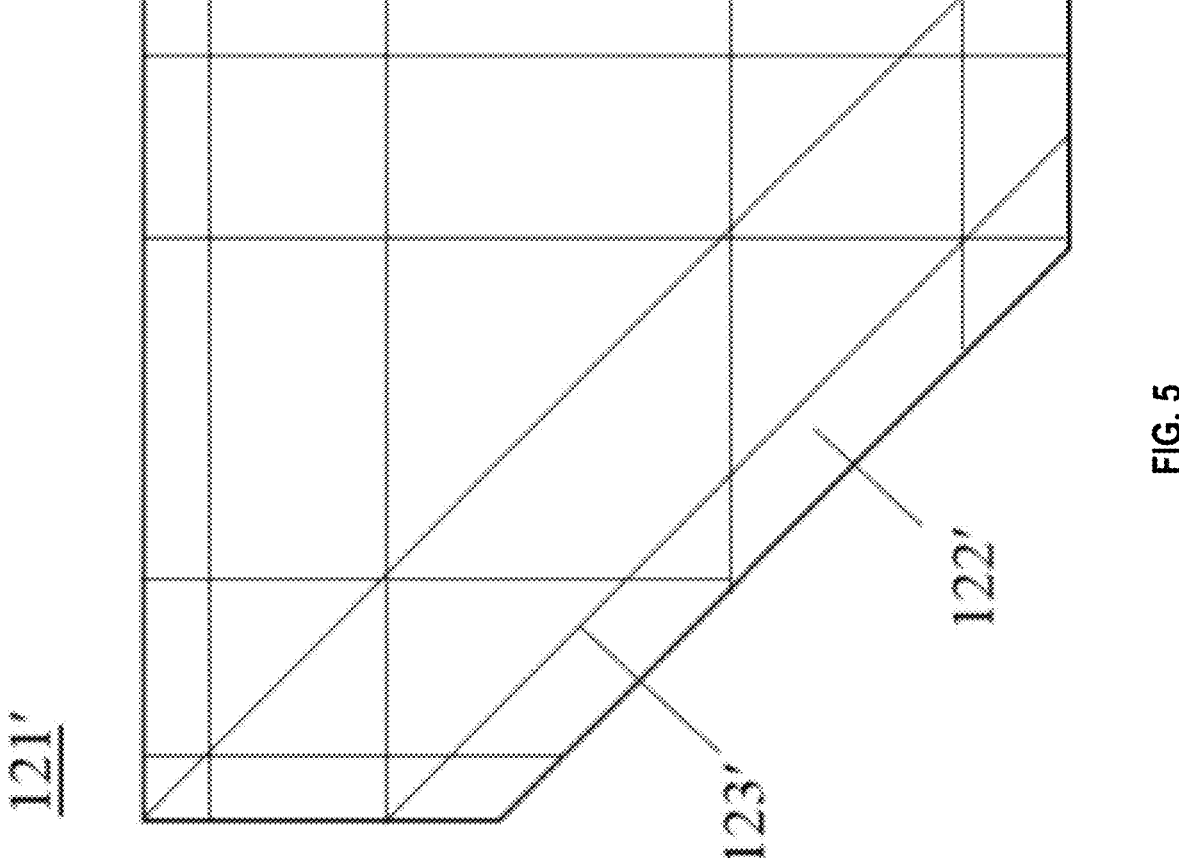
FIG. 5 is a partial enlarged view of a non-conducting region in FIG. 4.

Referring to FIGS. 4 and 5, when the shape of an electrode block 111' of a conducting region 11' in the electrode layer 1' is a right triangle, a connecting part 112' connects the right angle of one electrode block and the acute angle of the adjacent electrode block, the shape of the non-conducting sub-region 121' is a pentagon. The non-conducting sub-region 121' does not have a central axis. A plurality of the non-conducting sub-regions 121' are connected to form a non-conducting region 12'. When the cutting grooves 123' are linear grooves, the cutting groove 123' located in the non-conducting sub-region 121' includes a plurality of third cutting grooves, a plurality of fourth cutting grooves, and a plurality of fifth cutting grooves. The third cutting grooves, the fourth cutting grooves, and the fifth cutting grooves are respectively parallel to three sides of the right-angled triangle electrode block, and a plurality of third cutting grooves, a plurality of fourth cutting grooves, and a plurality of fifth cutting grooves intersect to form a plurality of suspending blocks 122'. It should be understood that the spacing change rules of the third cutting grooves, the fourth cutting grooves, and the fifth cutting grooves may be different, or they may be the same.

In other embodiments, the conducting region includes a main conducting region and a plurality of protrusions located on opposite sides of the main conducting region, and the plurality of conducting regions may be connected as one body. The structures of the conducting region and the non-conducting region include but are not limited to the above-mentioned embodiments.

In this embodiment, the touch panel includes, but is not limited to, a double-layer mutual capacitance touch panel, a single-layer mutual capacitance touch panel, and a self-capacitive touch panel. Both the double-layer mutual capacitance touch panel and the single-layer mutual capacitance touch panel include a driving electrode layer (Tx).

Figure 6:
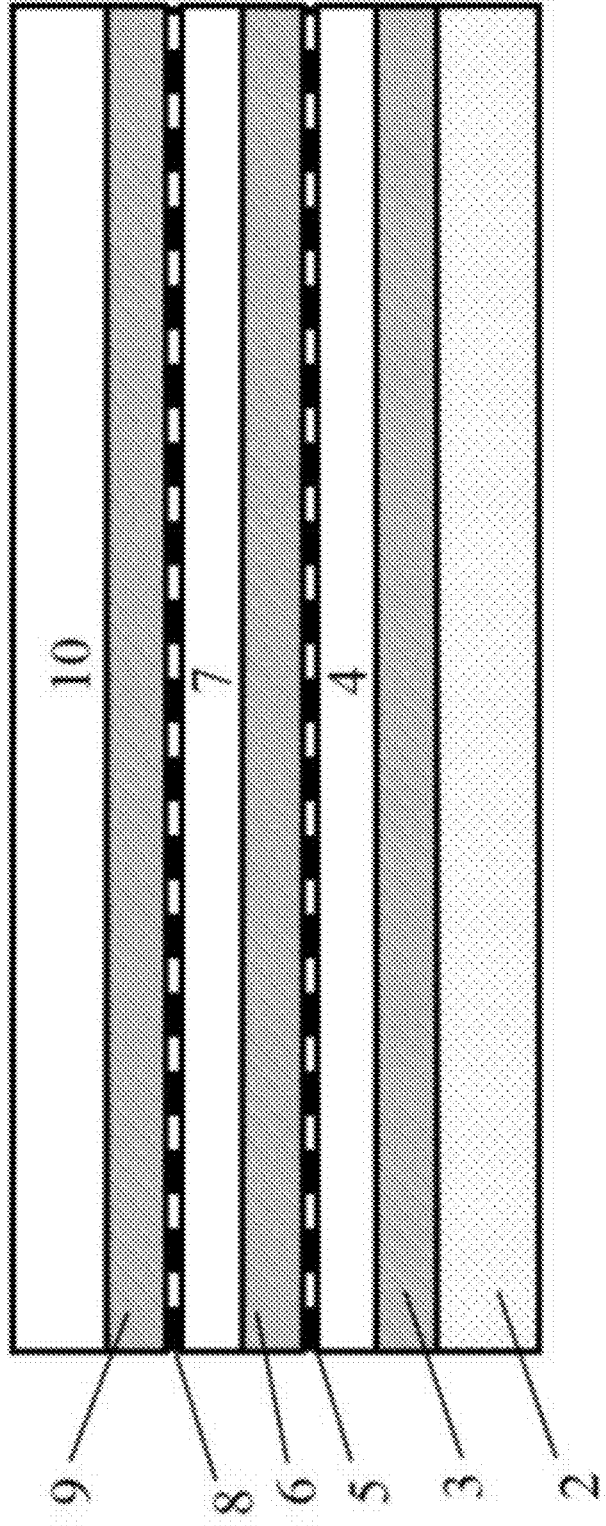
FIG. 6 is a schematic structural diagram of a touch panel according to an embodiment of the present disclosure.

Referring to FIG. 6, the double-layer mutual capacitance touch panel includes a top electrode 8 close to the touch-sensitive surface and a bottom electrode 5 facing away from the touch-sensitive surface. One of the top electrode 8 and the bottom electrode 5 is a driving electrode layer (Tx), and the other is a sensing electrode layer (Rx). In some implementations, the top electrode includes a plurality of top conducting regions arranged in parallel and spaced apart, a top non-conducting region located between adjacent top conducting regions, and a plurality of top suspending blocks located in the top non-conducting region. There are top cutting grooves between the top suspending block close to the top conducting region and the top conducting region, and between the adjacent top suspending blocks. The top conducting region and the top non-conducting region face the first extension direction, the top conducting region includes a plurality of top conducting sub-regions successively connected along the first direction, and the top non-conducting region includes a plurality of top non-conducting sub-regions successively connected along the first direction. The region surrounded by at least one top conducting sub-region in a top conducting region and at least one top conducting sub-region in an adjacent top conducting region constitutes the top non-conducting sub-region. The bottom electrode includes a plurality of bottom conducting regions arranged in parallel and spaced apart, bottom non-conducting regions located between adjacent bottom conducting regions, and a plurality of bottom suspending blocks located in the bottom non-conducting regions. There are bottom cutting grooves between the bottom suspending blocks close to the bottom conducting region and the bottom conducting region, and also between the adjacent bottom suspending blocks. The bottom conducting region and the bottom non-conducting region extend towards a second direction. The bottom conducting region includes a plurality of bottom conducting sub-regions successively connected along the second direction, and the bottom non-conducting region includes a plurality of bottom non-conducting sub-regions successively connected along the second direction. The region surrounded by at least one of the bottom conducting sub-regions in a bottom conducting region and at least one adjacent bottom conducting sub-region in an adjacent bottom conducting region constitutes the bottom non-conducting sub-region. The first direction and the second direction intersect to generate capacitance. In some implementations, the first direction is perpendicular to the second direction.

Figure 7:
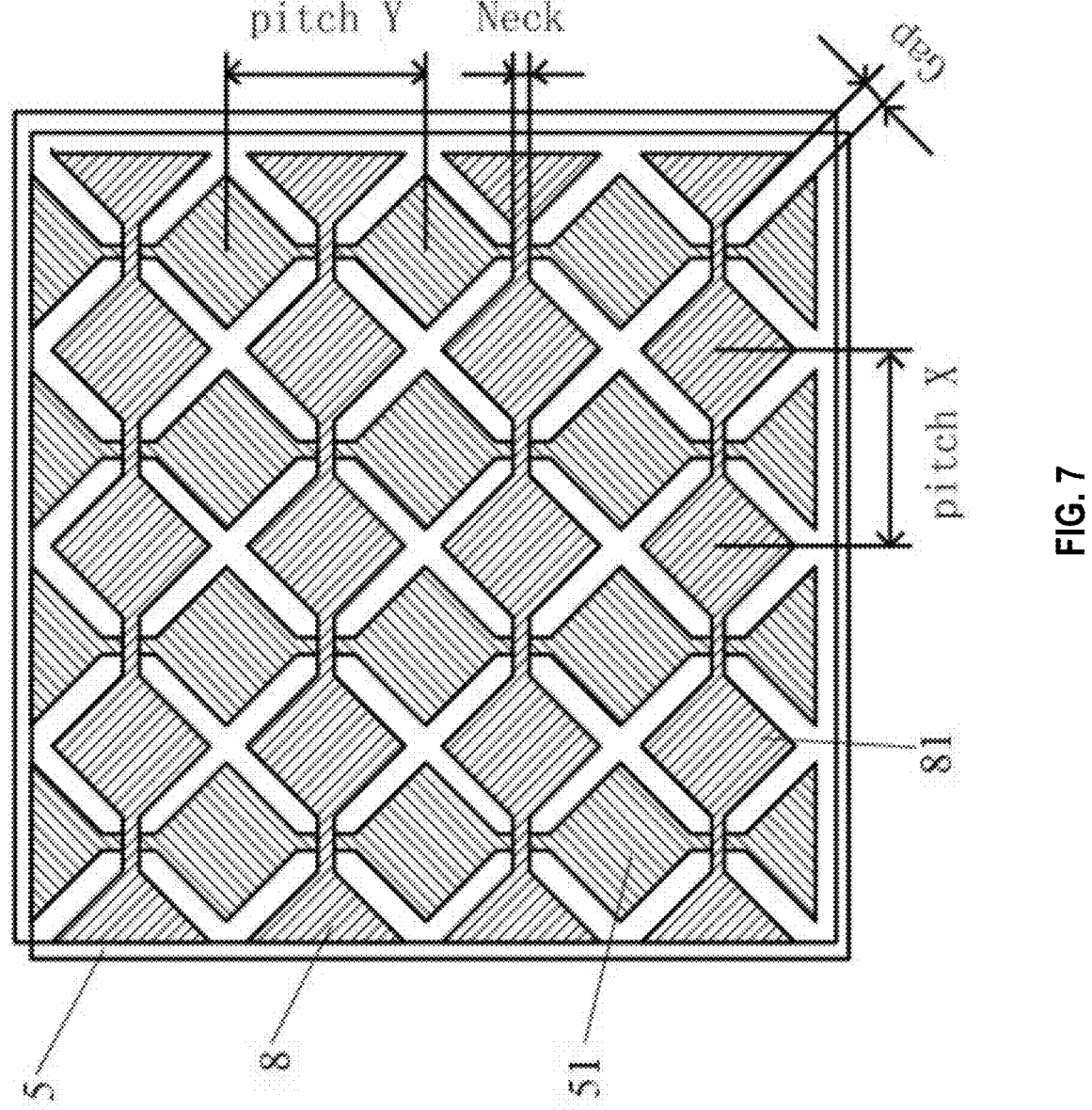
FIG. 7 is a partial projection schematic diagram of a top electrode on a bottom electrode plane according to the embodiment of the present disclosure.
Figure 8:
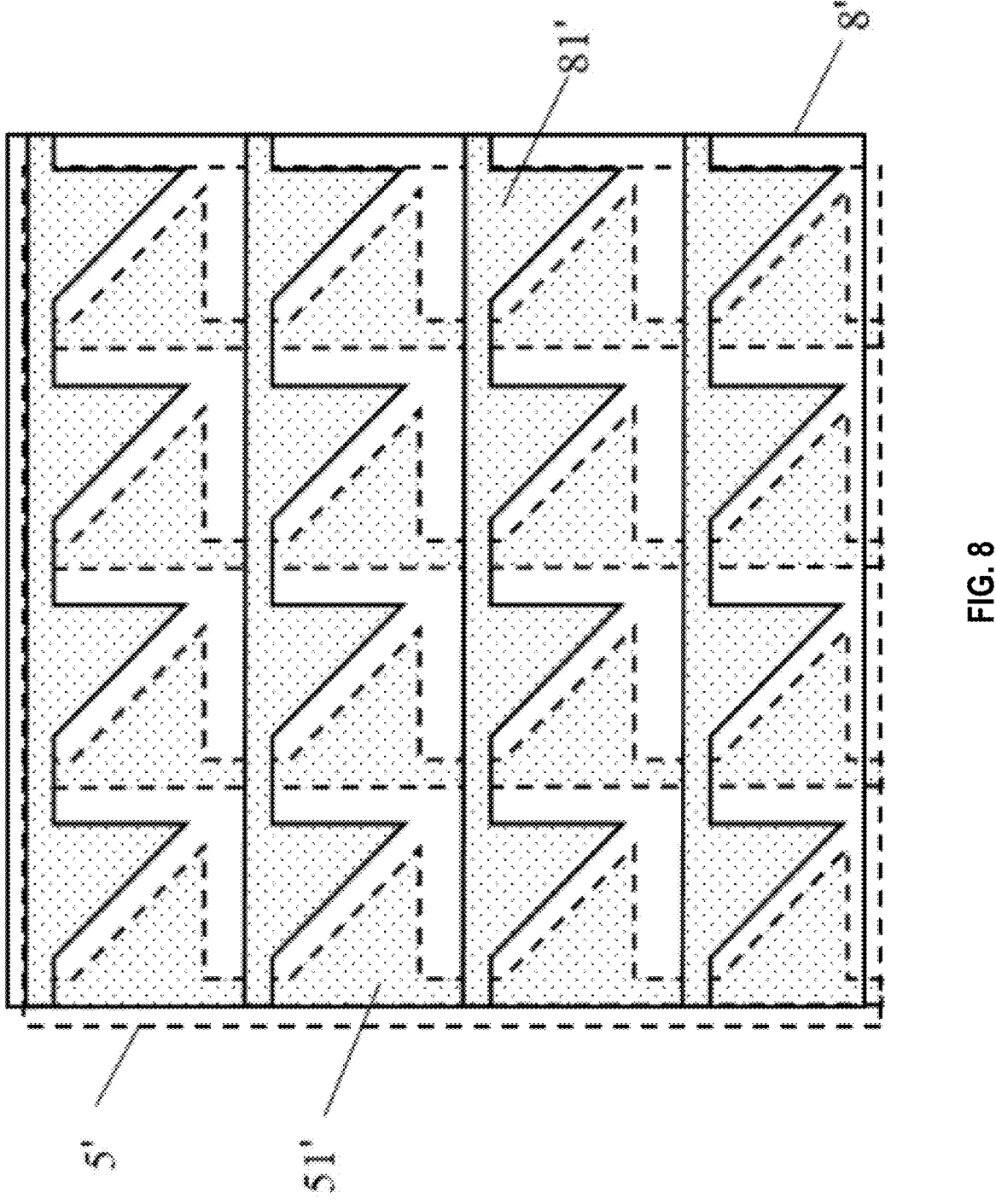
FIG. 8 is another partial projection schematic diagram of a top electrode on a bottom electrode plane according to the embodiment of the present disclosure.

Further, when the top conduction sub-region includes a top electrode block and a top connecting part, and the bottom conduction sub-region includes a bottom electrode block and a bottom connecting part, the region surrounded by two top electrode blocks in one top conducting region and the two top electrode blocks in the top conducting region constitutes the top non-conducting sub-region, and the region surrounded by the two bottom electrode blocks in one bottom conducting region and the two bottom electrode blocks in the adjacent bottom conducting region constitutes a bottom non-conducting sub-region. The orthographic projection of the top connecting part on the bottom electrode intersects the bottom connecting part, the orthographic projection of the top electrode block on the bottom electrode is located in the bottom non-conducting sub-region, and the orthographic projection of the bottom electrode block on the top electrode is located in the top non-conducting sub-region. FIG. 7 shows the projection of the top electrode 8 on the plane of the bottom electrode 5 when the shapes of the top electrode block 81 and the bottom electrode block 51 are both rhombus. FIG. 8 shows the projection of the top electrode 8' on the plane of the bottom electrode 5' when the shapes of both the top electrode block 81' and the bottom electrode block 51' are right triangles.

In an embodiment, the electrode layer is the top electrode or the bottom electrode, that is, one of the top electrode and the bottom electrode has the same structure as the electrode layer according to this embodiment, and the other electrode may be an electrode as shown in FIG. 1. In another embodiment, the structures of both the top electrode and the bottom electrode are the same as the structure of the electrode layer according to this embodiment.

In some implementations, the structures of both the top electrode and the bottom electrode are the same as the structure of the electrode layer according to this embodiment. That is, the density of top cutting grooves in the region close to the top conducting sub-region in the top non-conducting sub-region is greater than that of top cutting grooves in the region far away from the top conducting sub-region in the top non-conducting sub-region, and the density of the bottom cutting grooves of the region close to the bottom conducting sub-region in the bottom non-conducting sub-region is greater than that of the bottom cutting grooves in the region far away from the bottom conducting sub-region in the bottom non-conducting sub-region. At this time, the pattern formed by the orthographic projection of the top electrode on the bottom electrode and the bottom electrode includes, but is not limited to, Manhattan or Comb Drive. Manhattan type means that the width of the conducting region in the driving electrode layer is greater than that of the conducting region in the sensing electrode layer, and a plurality of conducting regions in the sensing electrode layer are connected; the Comb Drive type means that both the conducting regions of the top electrode and the bottom electrode include main conducting regions and a plurality of protrusions located on opposite sides of the main conducting regions.

It is to be understood that the arrangement, shape, width and density of the top cutting grooves may be the same or different from the arrangement, shape, width and density of the bottom cutting grooves.

In this embodiment, the touch panel may further include a display module. The display module is located on a side of the bottom electrode away from the top electrode, and a light-emitting surface of the touch panel is a touch-sensitive surface, and the touch panel includes a central region and an edge region located on the periphery of the central region, and the edge region is adjacent to the central region. The display module includes, but is not limited to, a liquid crystal panel (Open Cell, OC). Simulation and experimental results prove that the capacitance from the conducting region in the electrode layer to the upper ground of the display module in this embodiment is small. When the touch panel is a double-layer mutual capacitance touch panel or a single-layer mutual capacitance touch panel and the driving electrode layer in the touch panel adopts the electrode layer according to this embodiment, the smaller driving electrode layer to ground capacitance means a smaller driving load, thereby improving the ability to drive the load.

In an embodiment, referring to FIG. 6, the bottom electrode 5 is processed and prepared on the bottom substrate layer 4, and the top electrode 8 is processed and prepared on the top substrate layer 7. A first adhesive layer 3 is used to bond the bottom substrate layer 4 and the display module 2, a second adhesive layer 6 is used to bond the bottom electrode 5 and the top substrate layer 7, and a third adhesive layer 9 is used to bond the top electrode 8 and the cover plate 10. In another embodiment, the touch module includes a substrate layer, a bottom electrode and a top electrode, which are respectively prepared on two opposite surfaces of the base material layer. A fourth adhesive layer is used to bond the bottom electrode and the display module. A fifth adhesive layer is used to bond the top electrode and the cover plate. In another embodiment, the touch module includes a substrate layer. A bottom electrode, an insulating layer, and a top electrode are formed on one surface of the substrate layer in sequence. The insulating layer is used to isolate the bottom electrode and the top electrode. A sixth adhesive layer is used to bond the substrate layer and the display module, and a seventh adhesive layer is used to bond the top electrode and the cover plate.

It should be understood that since a wiring region of the display module is usually located at the edge region of the touch panel, a shielding layer is usually not provided on the edge region of the touch panel; or, in order to obtain electronic products with narrow borders, the edge region of the touch panel only has a shielding layer with a smaller width, resulting in the edge region of the touch panel having no shielding ability or weak shielding ability, which causes greater display noise in the edge region of the touch panel, affecting a signal-to-noise ratio of the touch signal, thereby affecting the touch effect in the edge region.

Figure 9:
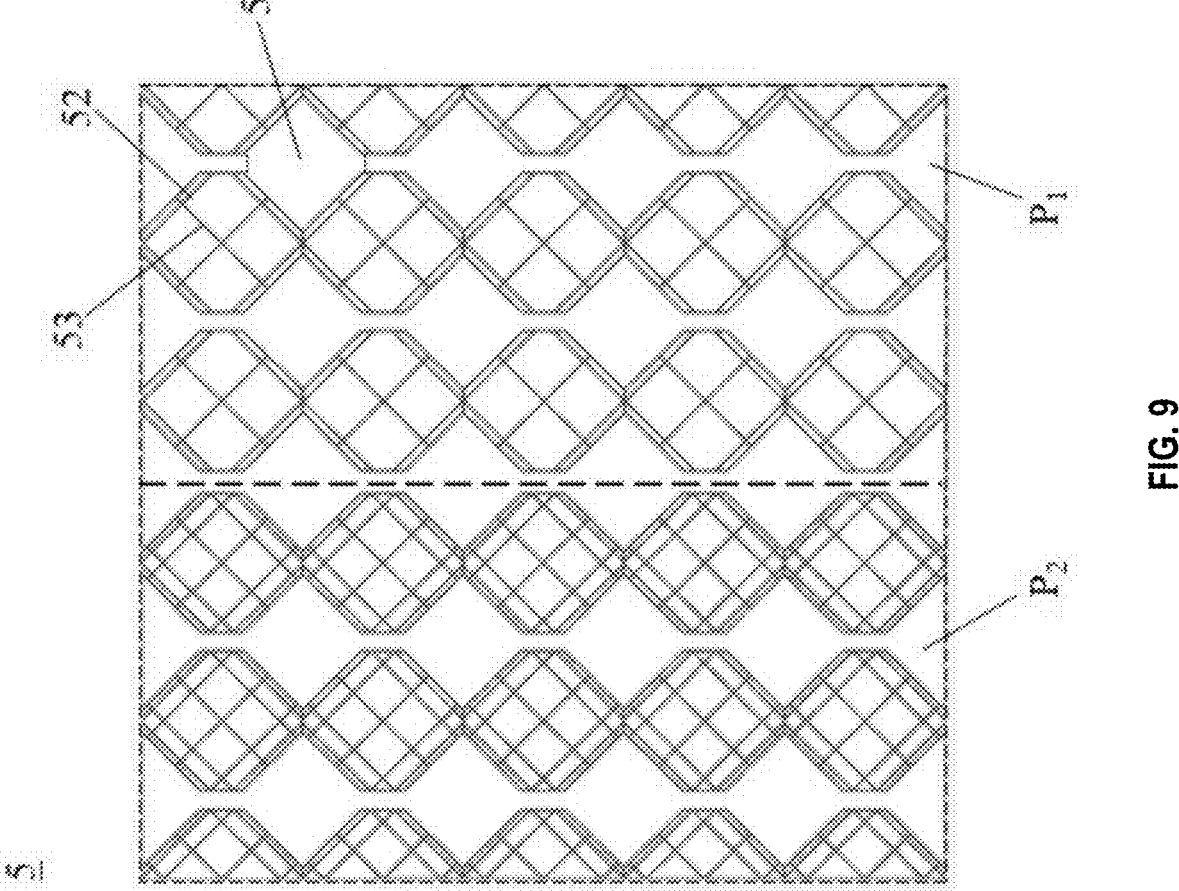
FIG. 9 is a partial structural schematic diagram of a bottom electrode according to an embodiment of the present disclosure.

In this embodiment, referring to FIG. 9, the density of the bottom cutting grooves of the bottom electrode located in the edge region (P1) is smaller than the density of the bottom cutting grooves of the bottom electrode located in the central region (P2). The above limitations allow the bottom suspending blocks located in the edge region to have a relatively large area and thus a relatively large shielding effect, which can reduce the noise from the display module below to a certain extent, thereby improving a signal-to-noise ratio of the touch signal in the edge region and further improving the touch effect in the edge region.

It should be understood that since the display module generates an electric field when it is working, when the bottom electrode is a sensing electrode layer, the sensing electrode layer close to the display module will couple more noise, thereby reducing the signal-to-noise ratio of the touch signal, and further affecting the touch effect.

In this embodiment, when the bottom electrode is a sensing electrode layer, the density of the cutting grooves of the bottom electrode located in the edge region is smaller than the density of the cutting grooves of the top electrode located in the edge region, and the density of the cutting grooves located in the central region is smaller than the density of the cutting grooves of the top electrode located in the central region, that is, the density of the bottom cutting grooves is smaller than the density of the top cutting grooves. The above limitation allows the bottom suspending block located in the edge region and the central region to have a larger area, so that the bottom suspending block has a relatively large shielding effect, which can reduce the noise from the display module below to a certain extent, and further improved touch effects.

For example, a structure of the bottom electrode and the top electrode in the double-layer mutual capacitance touch panel will be described below with reference to FIG. 7. It should be understood that the structures of the bottom electrode and the top electrode in the double-layer mutual capacitance touch panel include, but are not limited to, the following structures.

The top electrode 8 includes a plurality of top conducting regions arranged in sequence. The top conducting regions extend along the first direction. The top conducting region includes a plurality of top electrode blocks 81 arranged in sequence along the first direction. Adjacent top electrode blocks 81 are connected by the top connecting part, and the shape of the top electrode block 81 is rhombus. The region surrounded by the two top electrode blocks 81 in a top conducting region and the two top electrode blocks 81 in an adjacent top conducting region constitutes a top non-conducting sub-region, and a plurality of adjacent top non-conducting sub-regions connects and constitutes the top non-conducting region. The top cutting grooves include a plurality of linear first top cutting grooves and a plurality of linear second top cutting grooves. The first top cutting grooves and the second top cutting grooves are respectively parallel to the two sides intersecting with the top electrode block 81. And a plurality of first top cutting grooves and a plurality of second top cutting grooves intersect to form a plurality of rhombus-shaped top suspending blocks. From the edge of the top non-conducting sub-region to the central axis of the top non-conducting sub-region, the spacing between adjacent first top cutting grooves is sequentially enlarged in equal proportions, and the spacing between adjacent second top cutting grooves is sequentially enlarged in equal proportions. The change rule of the spacing of the first top cutting groove is the same as that of the second top cutting groove.

Correspondingly, the bottom electrode 5 includes a plurality of bottom conducting regions arranged in sequence, and the bottom conducting regions extend along the second direction. The bottom conducting region includes a plurality of bottom electrode blocks 51 arranged in sequence along the second direction, the adjacent bottom electrode blocks 51 are connected by bottom connecting parts, and the shape of the bottom electrode blocks 51 is rhombus. The region surrounded by the two bottom electrode blocks 51 in a bottom conducting region and the two bottom electrode blocks 51 in an adjacent bottom conducting region constitutes a bottom non-conducting sub-region, and a plurality of adjacent bottom non-conducting sub-regions are connected and form the bottom non-conducting region. The orthographic projection of the top connecting part on the bottom electrode intersects the bottom connecting part, and the orthographic projection of the top electrode block 81 on the bottom electrode is located in the bottom non-conducting sub-region. The orthographic projection of the bottom electrode block 51 on the top electrode is located in the top non-conducting sub-region. The bottom cutting grooves include a plurality of linear first bottom cutting grooves 52 and a plurality of linear second bottom cutting grooves 53, and a plurality of the first bottom cutting grooves and a plurality of the second bottom cutting grooves respectively intersect with the bottom electrode block 51, with the two intersecting sides being parallel. A plurality of first bottom cutting grooves and a plurality of second bottom cutting grooves intersect to form a plurality of rhombus-shaped bottom suspending blocks. From the edge of the bottom non-conducting sub-region to the central axis of the bottom non-conducting sub-region, the spacing between adjacent first bottom cutting grooves is sequentially enlarged in equal proportions, and the spacing between adjacent second bottom cutting grooves is sequentially enlarged in equal proportions. The change rule of the spacing of the first undercut grooves is the same as the change rule of the spacing of the second undercut grooves.

As shown in FIG. 3, when the numbers of the first top cutting grooves and the second top cutting grooves in the top non-conducting sub-region and the first bottom cutting grooves and the second bottom cutting grooves in the bottom non-conducting sub-region are both 7, the width thereof is 40 μm, the first term a1 is 0.2 mm, and the common ratio thereof q is 3.567892575 mm. As compared with the seven cutting grooves parallel to one edge of the electrode block in the equidistant cutting manner shown in FIG. 1, the capacitance change $\Delta C/C0$ of the touch operation in this embodiment may be increased by 28.14%, which is equivalent to the capacitance change of the touch operation when the number of cutting grooves parallel to one edge of the electrode block is 13 in the equidistant cutting manner shown in FIG. 1. The difference between the structure shown in FIG. 1 and the structure shown in FIG. 3 is only that the relationship satisfied by the spacing between adjacent cutting grooves is different.

Referring to FIG. 9, when the number of the first top cutting grooves in the top non-conducting sub-region, the number of the second top cutting grooves in the top non-conducting sub-region, the number of the first bottom cutting grooves in the bottom non-conducting sub-region of the edge region (P1), and the number of the second bottom cutting grooves in the bottom non-conducting sub-region of the edge region (P1) are all 7, the first item a1 satisfies a1=0.2 mm, and the common ratio q satisfies q=3.567892575 mm, while the number of the first bottom cutting grooves and that of the second bottom cutting grooves in the bottom non-conducting sub-region of the central region (P2) are 5, as compared with the case when the first bottom cutting grooves and the second bottom cutting grooves cut at equal intervals and the number thereof is 7, the noise in the edge region can be reduced by about 23%.

When the bottom electrode is a sensing electrode layer and the top electrode is a driving electrode layer, the numbers of the first top cutting grooves and the second top cutting grooves in the top non-conducting sub-region are both 7, and the numbers of the first bottom cutting grooves and the second bottom cutting grooves in the bottom non-conducting sub-region are both 5, as compared with the case when the first bottom cutting grooves and the second bottom cutting grooves in the bottom non-conducting sub-region and the first top cutting grooves and the second top cutting grooves in the top non-conducting sub-region cut at equal intervals and the number thereof are 7, the noise from the display module can be reduced by about 7%, the capacitance change $\Delta C/C0$ can be increased by 10%, the capacitance from the driving electrode layer Tx to the system ground (such as the upper ITO layer (OC) of the LCD panel) can be reduced by 9%, which means the driving load can be reduced by 9%.

It should be understood that the parameters of the cutting grooves are related to the size of the non-conducting sub-region. The parameters of the cutting grooves include the width and number of the cutting grooves. The non-conducting sub-region with a fixed size includes, but is not limited to, one cutting manner. The width and number of the cutting grooves are adjustable.

The technical solution of this present disclosure has the following advantages:

1. The touch panel according to the present disclosure utilizes the principle that the density of electric field lines in the edge region close to the conducting region in the non-conducting region is greater than the density of the electric field lines in the central region far away from the conducting region. The density of the cutting grooves in the edge region is defined to be greater than the density of the cutting grooves in the central region, so that the distribution of the cutting grooves matches the distribution of the electric field lines, which improves the distribution of the electric field lines, thereby increasing the signal quality during the touch process to a certain extent, and further increasing the touch effect of the touch panel.

2. In the touch panel according to the present disclosure, the density of the cutting grooves of the bottom electrode located in the edge region is defined to be smaller than the density of the cutting grooves of the bottom electrode located in the central region, so that the bottom suspending block located in the edge region has a relatively larger area and thus has a relatively large shielding effect, which can reduce the noise from the lower display module to a certain extent, thereby improving the signal-to-noise ratio of the touch signal in the edge region, and further improving the touch effect in the edge region.

3. In the touch panel according to the present disclosure, the density of the cutting grooves of the bottom electrode located in the edge region is defined to be smaller than the density of the cutting grooves of the top electrode located in the edge region, so that the density of the cutting grooves of the bottom electrode located in the central region is smaller than the density of the cutting grooves of the top electrode located in the central region, and therefore the bottom suspending blocks located in the edge region and the central region have a larger area, and the bottom suspending blocks have a relatively larger shielding effect, the noise from the display module below can be reduced to a certain extent, and further improving the touch effect.

4. The touch display device according to the present disclosure has high signal quality and small load during the touch process, and has excellent touch effect.

According to the difference in the degree of negative impact of the suspending block on the electric field between the conducting regions, the cutting grooves between the suspending blocks in the edge regions with greater negative impact on the electric field are adjusted in this embodiment. Through small-scale adjustment, the overall negative impact is significantly reduced, effectively increasing the number of electric field lines that may be affected by touch operations, thereby improving the attenuation of the touch effect of the suspending blocks in the electrode layer on the capacitive touch screen.

Taking a double-layer mutually capacitive touch panel as an example, the steps for determining the parameters of the cutting groove are explained below. The top non-conducting sub-region and the bottom non-conducting sub-region have the same size and shape, and the top electrode blocks and the bottom electrode blocks are all diamond-shaped and have the same size, the top and bottom connecting parts have the same width, and the parameters of the top and bottom cutting grooves are the same.

S1. According to the size of the touch panel and the number of channels used in the touch solution, determining the distance (pitch X) between the central axes of the two adjacent top electrode blocks in the same top conducting sub-region, and the distance (pitch Y) between the central axes of the two adjacent bottom electrode blocks in the same bottom conducting sub-region. FIG. 7 shows the orthographic projection of the top electrode on the bottom electrode;

S2. Determining the material type, stacking relationship and thickness of each layer of the touch panel and peripheral devices, including but not limited to the stacked structure of the touch panel (GFF structure, FFF structure, GF1-Bridge structure, GF2-DITO structure, GG2-DITO structure, OGS structure, GG1-Bridge structure, G refers to Glass, F refers to Film), the lamination method and spacing of the touch panel and display module (frame lamination, zero lamination, full lamination), glue type and thickness of full lamination use, electrode material (ITO, AgNW, metal mesh, printed copper wire), material (PET, glass) and thickness of a substrate layer, material (OCA, SCA) and thickness of a third adhesive layer, material (glass, PC, PMMA) and thickness of a cover plate;

S3. Using finite element simulation tools to establish a simulation model based on the parameters determined in steps S1 and S2;

S4. Preliminarily determining the width (Neck) range of the connecting part and the minimum distance (Gap) range between the orthographic projection of the top electrode block on the bottom electrode and the bottom electrode block based on the driving capability of the capacitive touch component;

S5. Based on the distance (pitch X) between the central axes of two adjacent top electrode blocks, the distance (pitch Y) between the central axes of two adjacent bottom electrode blocks, and the minimum distance (Gap) range between the orthographic projection of the top electrode block on the bottom electrode and the bottom electrode block, calculating the distance between adjacent conducting sub-regions, that is, the width (D) range of the non-conducting sub-regions;

S6. Comprehensively designing the number of cutting times for the non-conducting sub-region based on cost and process difficulty. If the width of the cutting groove is small, it can be ignored;

S7. Determining the quantitative relationship (such as geometric sequence or arithmetic sequence) satisfied by the spacing between adjacent cutting grooves, and obtaining a variety of different cutting manners based on the width (D) of one-half of the non-conducting sub-region, where different Neck values and Gap values correspond to a variety of different cutting manners;

S8. Selecting the optimal cutting manner and the optimal Neck value and Gap value through finite element simulation, for example, obtaining the capacitance value C0 generated between the driving electrode layer and the sensing electrode layer when no touch operation is performed through finite element simulation, and the capacitance value C generated between the driving electrode layer and the sensing electrode layer during a touch operation, thereby obtaining the difference in capacitance value ΔC with or without touch operation ΔC=C0−C, and then obtaining the capacitance change amount ΔC/C0 of the touch operation; conducting finite element simulations on various cutting manners corresponding to different Neck values and Gap values, and selecting the cutting manner, Neck value and Gap value with larger ΔC/C0 as the optimal solution.

S9. Preparing the touch panel based on the optimal solution, and selecting the optimal parameters based on actual measurements as mass production parameters.

For example, when a 16:9 86-inch display module is used and the number of channels of the driving electrode layer (Tx) is 124, in order to facilitate the design of the touch algorithm, pitch X and pitch Y tend to be equal, and the number of channels for the sensing electrode layer (Rx) is selected as 224. At this point, pitch X=8.49 mm and pitch Y=8.65 mm are calculated. When GAP=0.9 mm and D≈6.9591 mm, it is determined that the number of first and second cutting grooves is 7, and the width of the cutting groove is 40 μm. When the spacing between adjacent cutting grooves satisfies an equal ratio sequence, multiple different cutting manners may be obtained as shown in Table 1:

TABLE 1

| First Term a1 (mm) | Common Ratio q |
|---|---|
| 0.1 | 5.317688544 |
| 0.2 | 3.567892575 |
| 0.3 | 2.783570211 |
| 0.4 | 2.310493729 |
| 0.5 | 1.9837673 |
| 0.6 | 1.739624224 |
| 0.7 | 1.547489752 |
| 0.8 | 1.390618285 |
| 0.9 | 1.258961183 |
| 1 | 1.14607108 |

Of course, an arithmetic sequence scheme may also be used for segmentation. When the spacing between adjacent cutting grooves meets the arithmetic sequence, a variety of different cutting manners may be obtained as shown in Table 2:

TABLE 2

| First Term a1 (mm) | Common Ratio q |
|---|---|
| 0.1 | 1.053183333 |
| 0.2 | 0.953183333 |
| 0.3 | 0.853183333 |
| 0.4 | 0.753183333 |
| 0.5 | 0.653183333 |
| 0.6 | 0.553183333 |
| 0.7 | 0.453183333 |
| 0.8 | 0.353183333 |
| 0.9 | 0.253183333 |
| 1 | 0.153183333 |

It should be understood that other non-touch capacitive devices (such as capacitive pressure sensors) may also use the electrode layer according to this embodiment.

Figure 11:
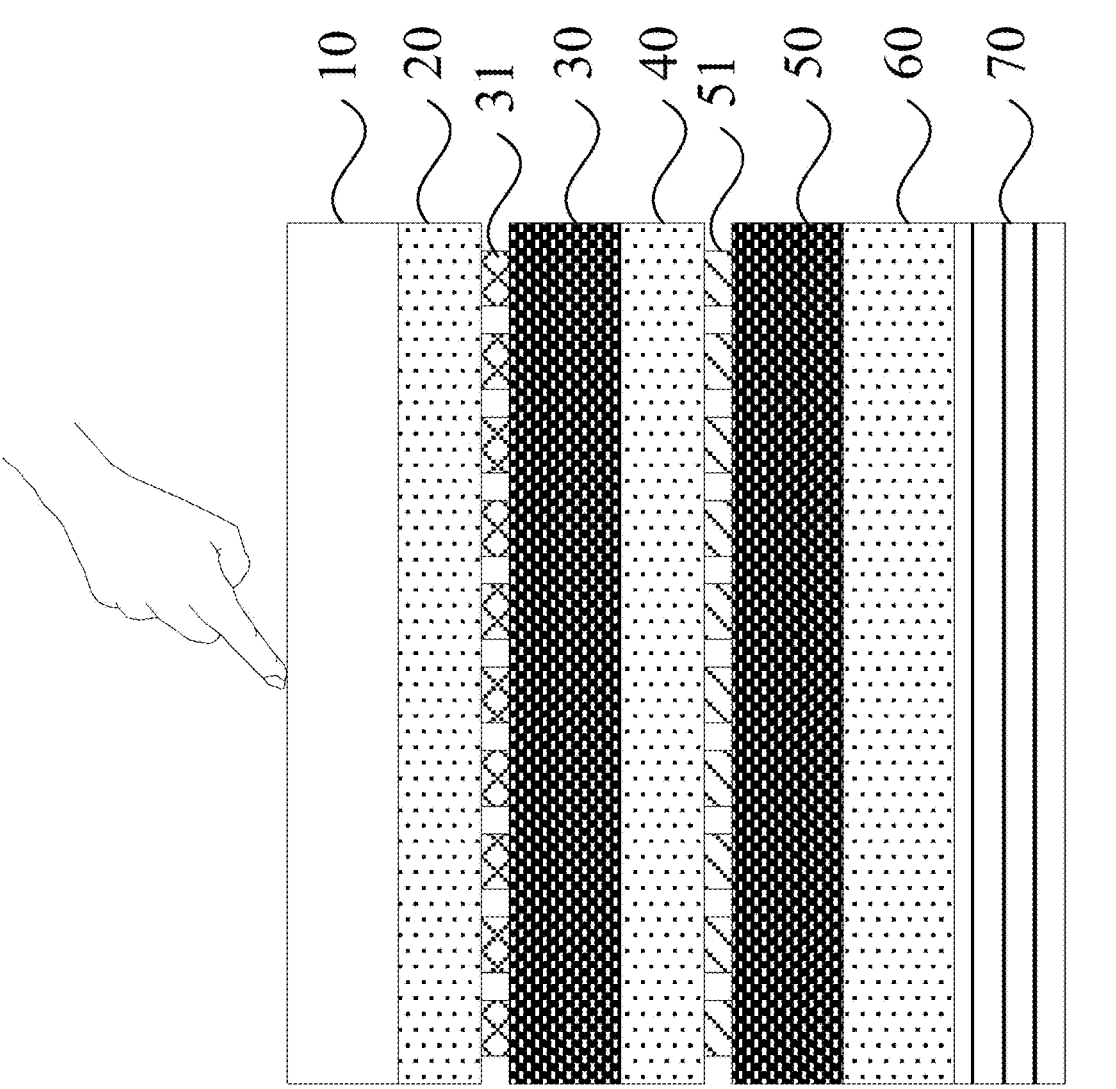
FIG. 11 is a schematic diagram of an overall structure of a touch panel.

The overall structure of a capacitive touch panel is shown in FIG. 11, which integrates components for display and components for touch detection, and each component is generally distributed in a layered manner. The components used to achieve display include a display module 70, and the components used to achieve touch detection include functional components and assembly components. The functional components mainly include a cover plate 10 that users may directly contact, two layers of electrodes used to form touch detection (defined as the top conducting region 31 and the bottom conducting region 51 according to the relative position relationship), a top substrate layer 30 used to attach the top conducting region 31, and a bottom substrate layer 50 used to attach the bottom conducting region 51. The assembly components mainly include an adhesive layer for bonding various functional components together, and being formed by the adhesive, such as a first adhesive layer 20 between the cover plate 10 and the top substrate layer 30, a second adhesive layer 40 between the top substrate layer 30 and the bottom substrate layer 50, and a third adhesive layer 60 between the bottom substrate layer 50 and the display module 70. Each adhesive layer bonds adjacent two layers of components together, and the display module 70 includes but is not limited to a liquid crystal display module, and OLED display module.

Figure 12:
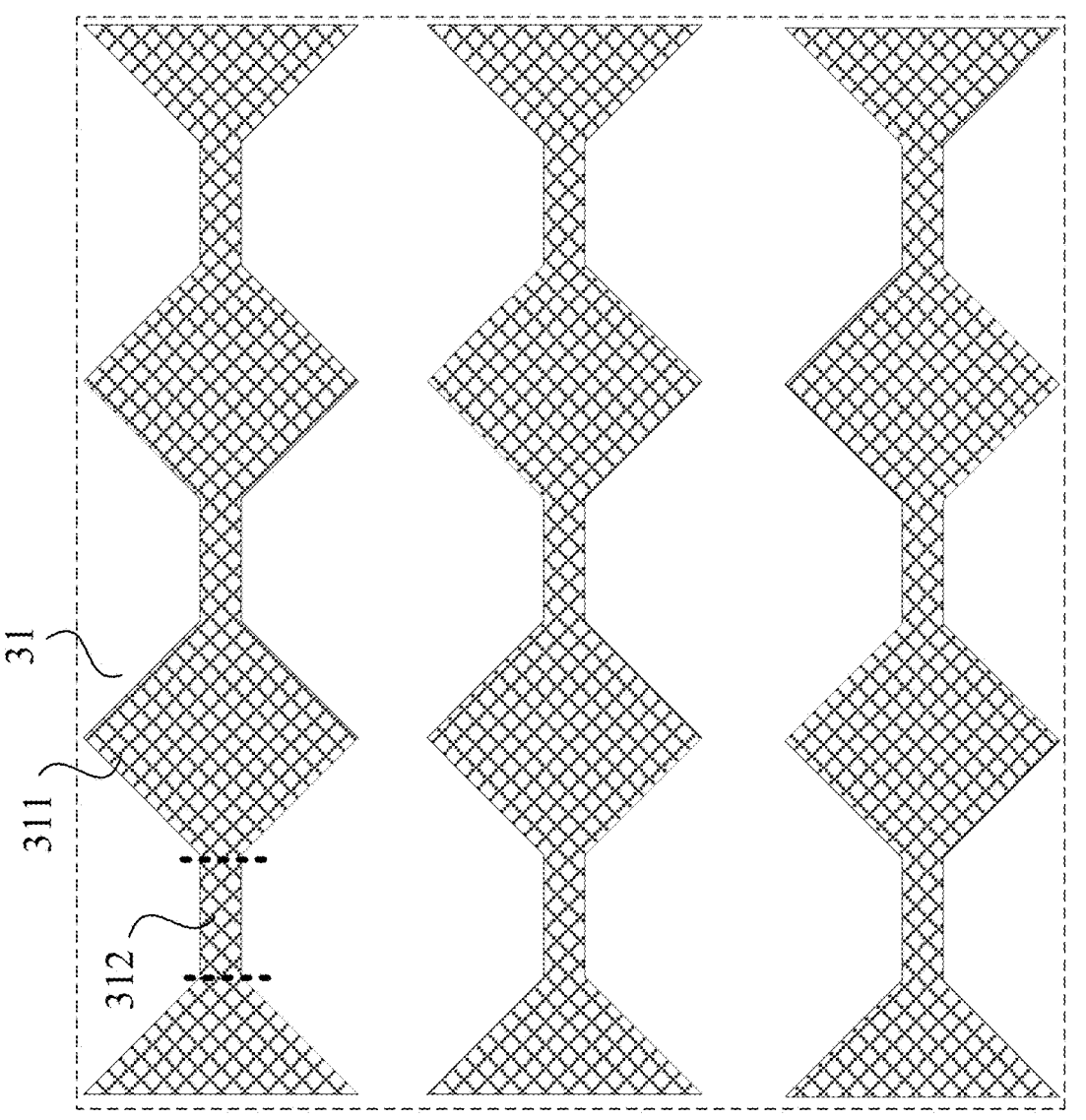
FIG. 12 is a schematic diagram of an overall structure of a first conducting region of the touch panel.
Figure 13:
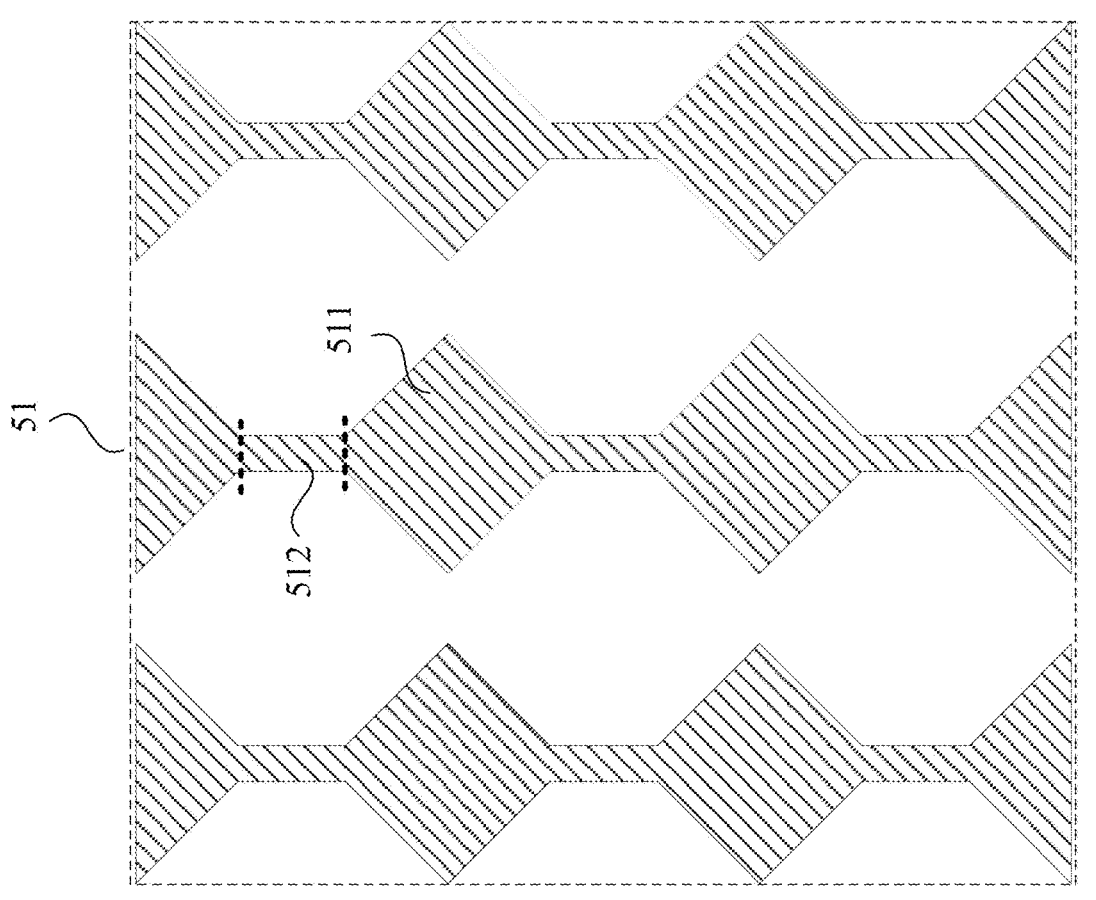
FIG. 13 is a schematic diagram of an overall structure of a second conducting region of the touch panel.
Figure 14:
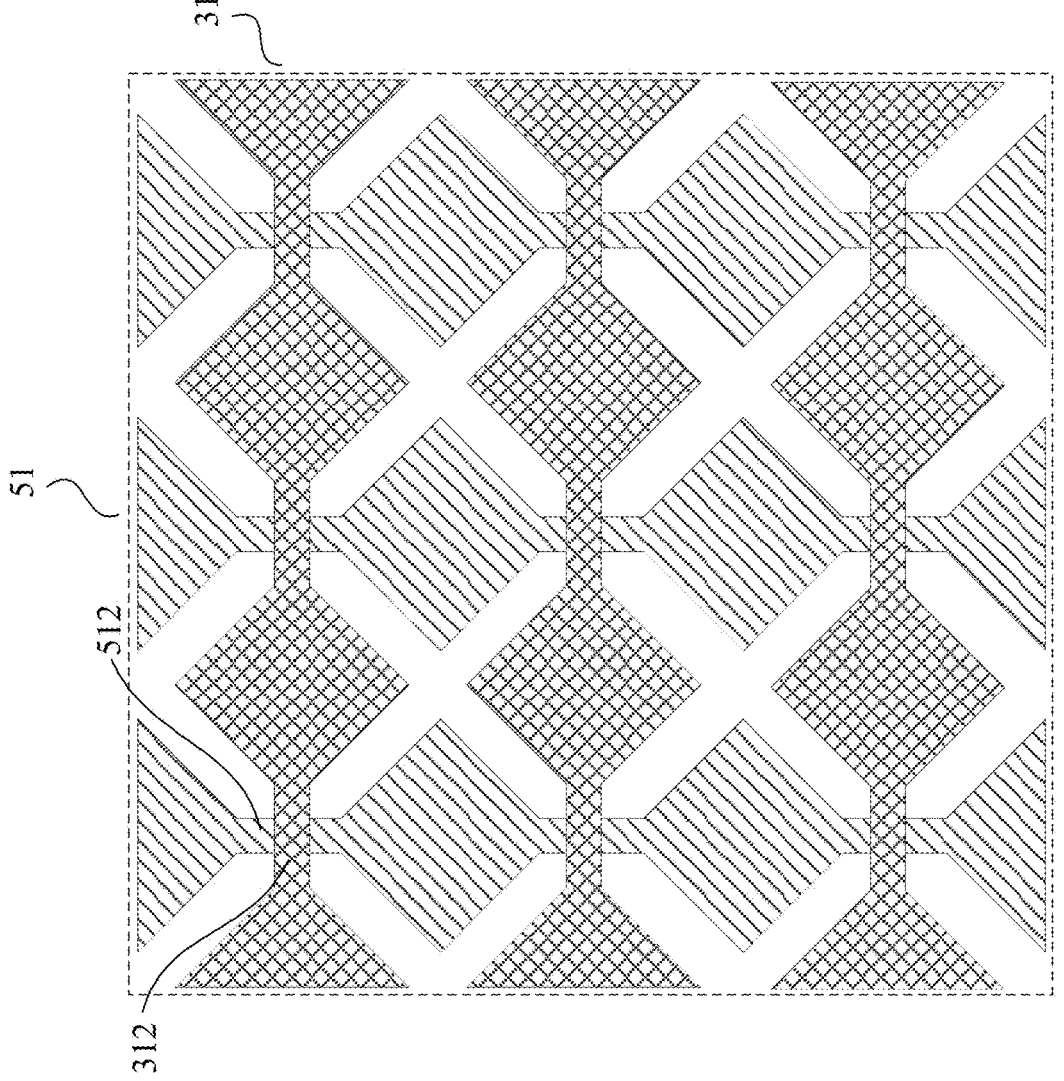
FIG. 14 is a schematic diagram of an overall layout of a conducting region shown in FIGS. 12 and 13.

The components that achieve touch position detection in the above structure are mainly the top conducting region 31 and the bottom conducting region 51. Referring to FIG. 12, the top conducting region 31 includes multiple sets of top electrode blocks 311, and each set of top electrode blocks 311 is sequentially connected and extended in the same direction through the top connecting part 312. The multiple sets of top electrode blocks 311 are distributed parallel and equidistant, presenting the electrode block array shown in FIG. 12. Referring to FIG. 13, the bottom conducting region 51 includes multiple sets of bottom electrode blocks 511. Each set of bottom electrode blocks 511 is sequentially connected and extends in the same direction through the bottom connecting part 512. Multiple sets of bottom electrode blocks 511 are distributed in parallel and equidistant directions, presenting the electrode block array shown in FIG. 13. The extension directions of the top conducting region 31 and the bottom conducting region 51 intersect, for example, perpendicular to each other. If they are perpendicular to each other, the top conducting region 31 and bottom conducting region 51 are set at different layers, and when viewed from the top in the orientation shown in FIG. 11, a projection layout is presented as shown in FIG. 14. In actual touch detection, one layer in the top conducting region 31 and bottom conducting region 51 serves as the transmitting electrode, and the other layer serves as the receiving electrode, forming a capacitor at the intersection node shown in FIG. 14.

Figure 15:
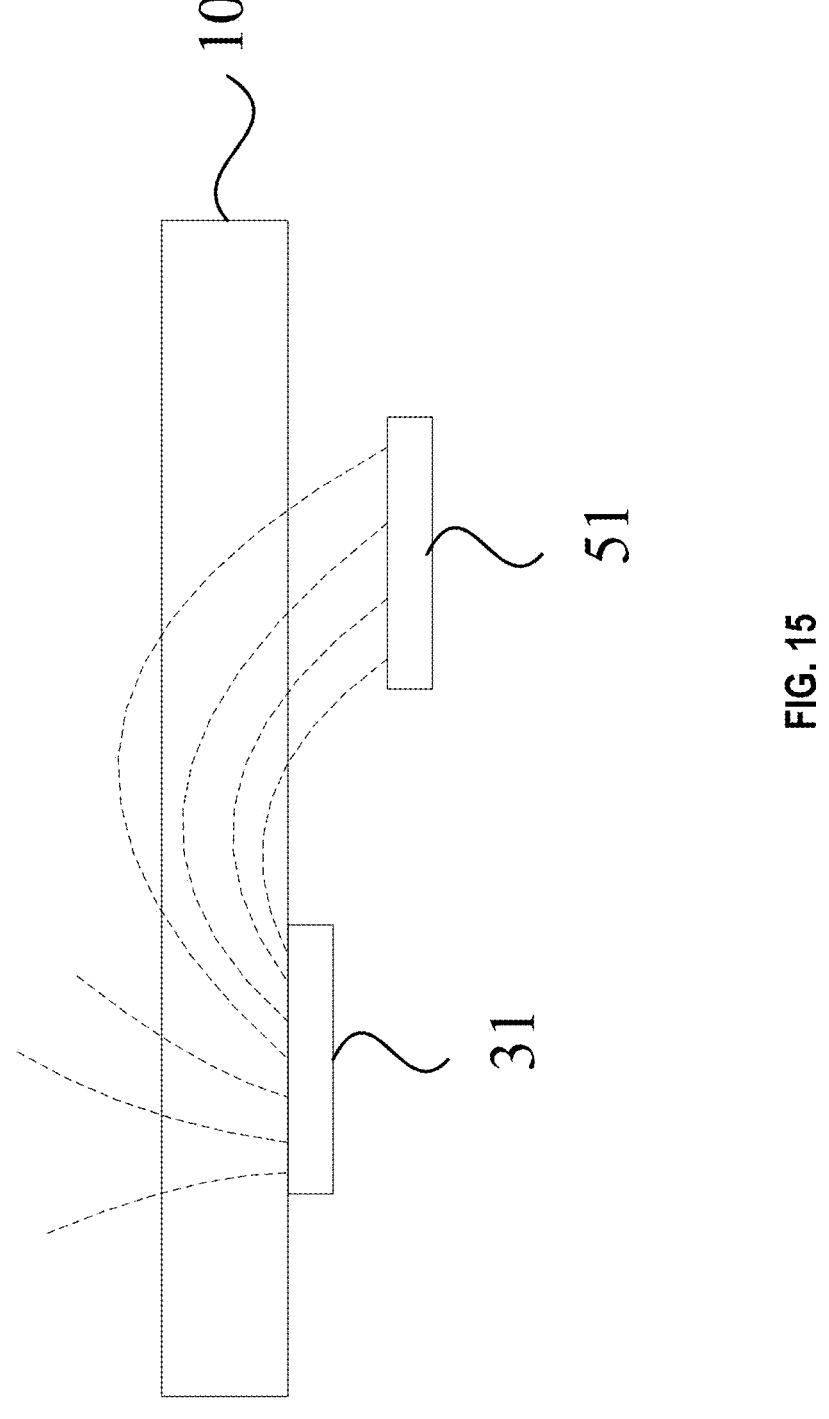
FIGS. 15 and 16 are schematic diagrams of an interaction process detection principle for a capacitive touch panel.
Figure 16:
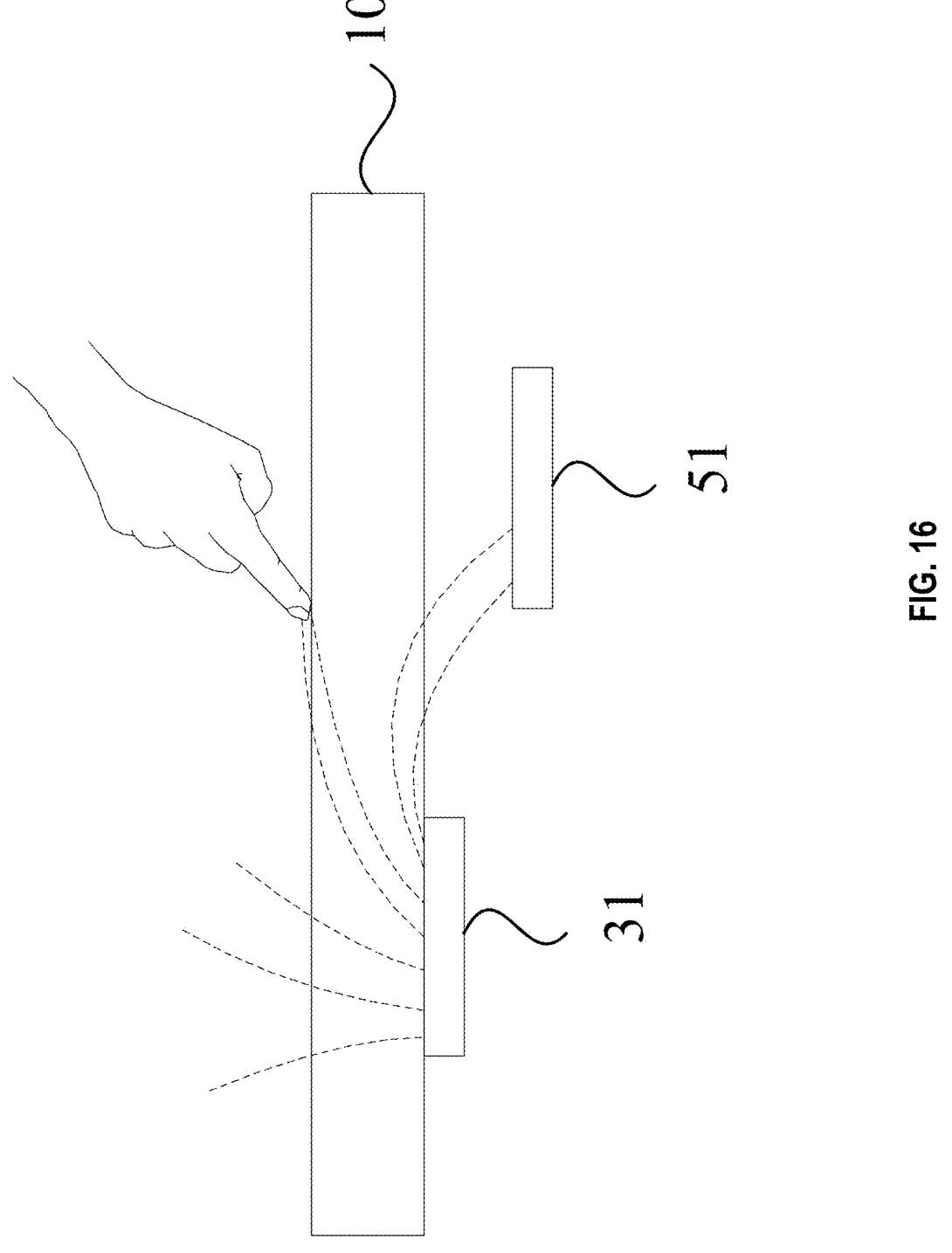

As shown in FIG. 15, taking the top conducting region 31 as the emitting electrode and the bottom conducting region 51 as the receiving electrode as an example, the touch panel emits signals through the top conducting region 31. Because the top conducting region 31 and the bottom conducting region 51 are essentially equivalent to the two poles of the capacitor, the emission signal forms an electric field between the top conducting region 31 and the bottom conducting region 51. As shown in FIG. 15, a stable charge state may be detected through the bottom conducting region 51 when the electric field is not disturbed. When fingers or other conducting objects come into contact on the surface of the cover plate 10, as shown in FIG. 16, some of the charges in the capacitor are absorbed, resulting in a decrease in the capacitance value. This change may be detected through the bottom conducting region 51, and the position of the touch point may be obtained, the detection is completed.

In touch panels, the conducting region is mostly made of conducting materials such as SNW (silver nanowire), ITO (indium tin oxide), or MM. Whether made by adding or reducing conducting materials, the electrode layer cannot only retain the required conducting materials in the conducting region, but a non-conducting region with the same material as the conducting region needs to be retained outside the conducting region because of the manufacturing process and/or the consideration of optical effects (if there is no conducting material outside the conducting region, resulting in differences in transmittance in different areas of the conducting layer and thus causing a decrease in display effect).

Figure 17:
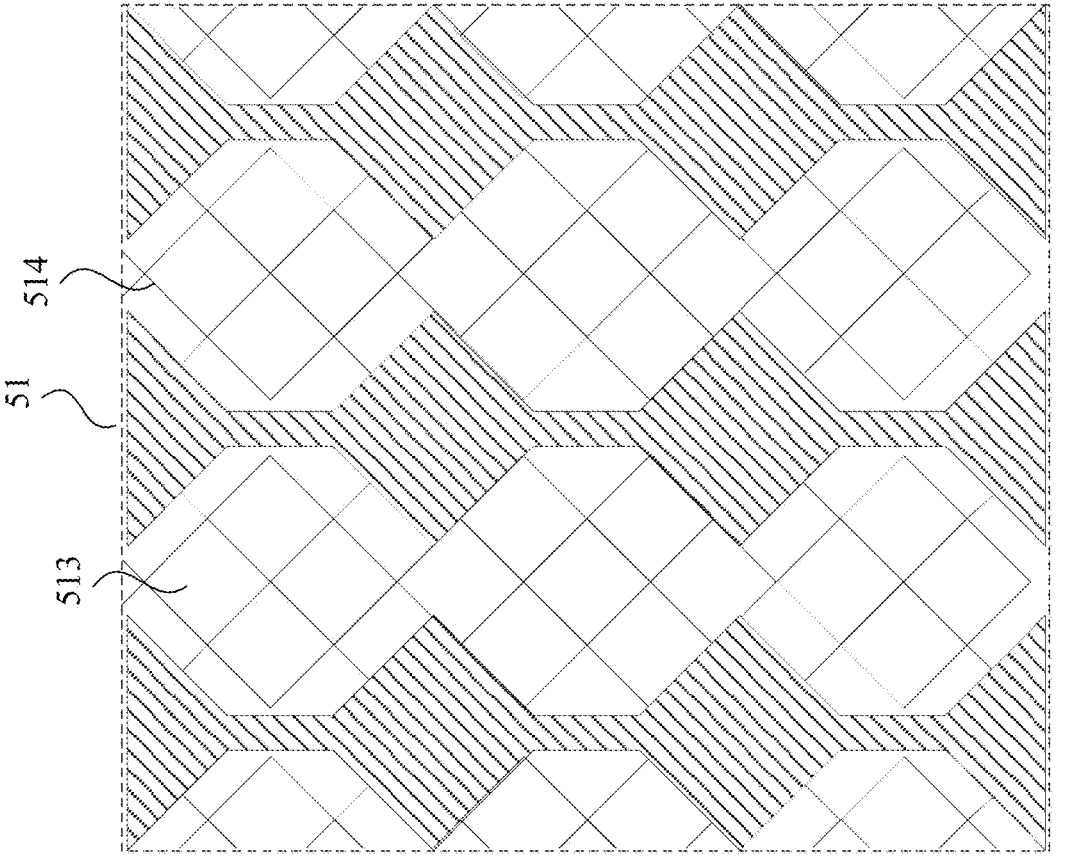
FIG. 17 is a schematic diagram of an electrode layer structure of a touch panel.

However, the non-conducting region made of conducting materials will affect the electric field lines between the transmitting electrode and the receiving electrode, resulting in fewer electric field lines that may pass through the cover plate 10 as shown in FIG. 15. When the touch operation shown in FIG. 16 is performed, the mutual capacitance value between the transmitting electrode and the receiving electrode will decrease as compared with the situation without a non-conducting region, which means that the amount of touch detection signal generated by the touch operation will be negatively affected, and thus overall attenuation touch effect. One of the methods for reducing the negative impact of non-conducting regions, such as making finer cuts on non-conducting regions, as shown in FIG. 17, is to uniformly set multiple cutting grooves 514 on non-conducting regions 513 without cutting, as shown in FIG. 13. Based on this design concept, when the proportion of adjustable mutual capacitance values should further increase, it can be achieved by adding cutting grooves 514 on non-conducting regions 513 of the same size, which will also lead to a decrease in yield and an increase in production time due to the complexity of manufacturing processes, increased cutting times, ultimately resulting in an overall cost increase.

In response to the above technical issues, this scheme proposes an improvement plan. Based on the difference in the negative impact of the suspending blocks on the electric field between the conducting regions, the cutting grooves between the suspending blocks in the edge regions with greater negative impact on the electric field will be adjusted. Through small-scale adjustments, the overall negative impact will be significantly reduced, effectively increasing the number of electric field lines that may be affected by touch operations, thereby improving the attenuation of the touch effect of the suspending blocks in the electrode layer on the capacitive touch screen, and thus overall production costs is controlled.

Hereinafter, each embodiment of the present disclosure will be described in details.

Figure 10:
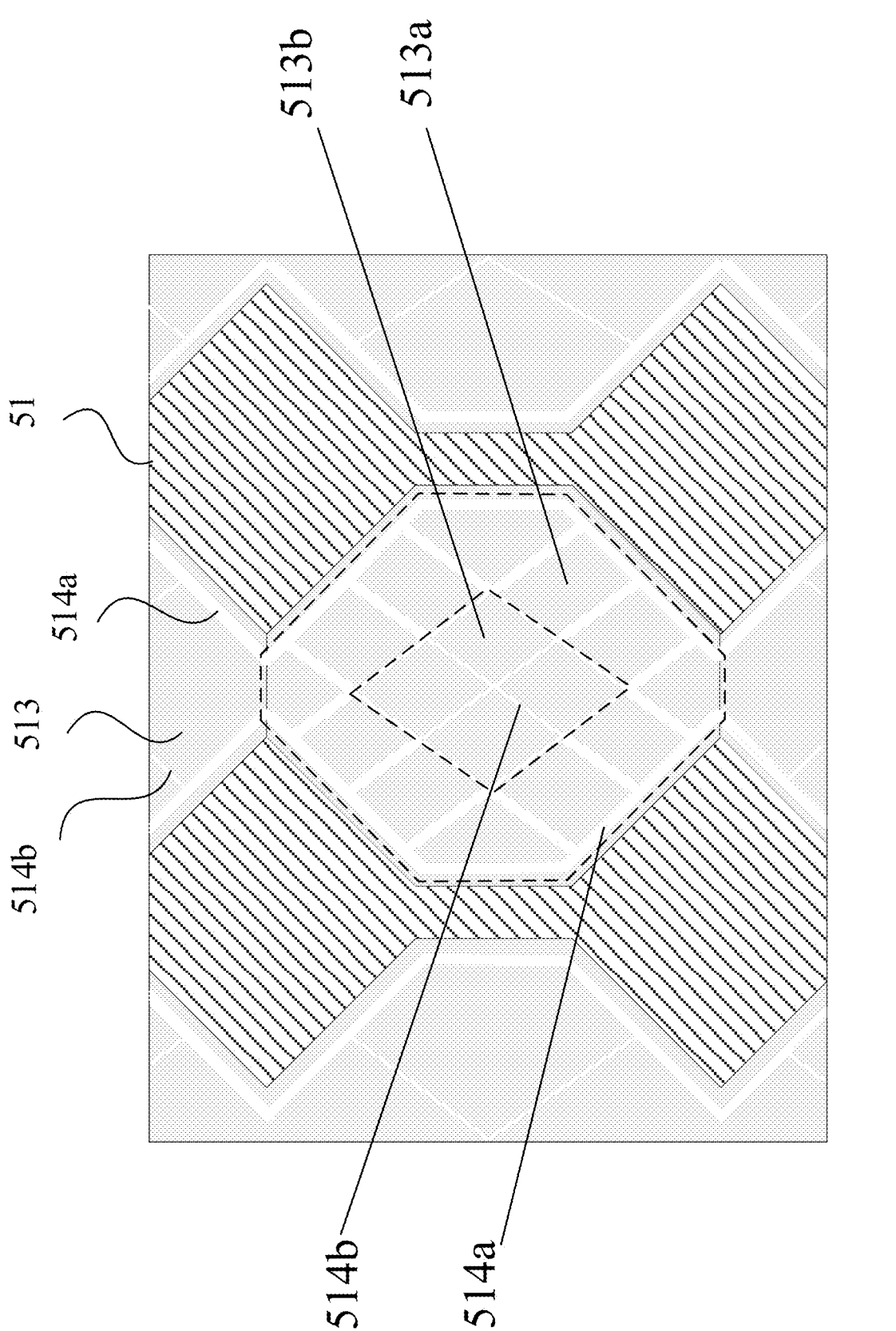
FIG. 10 is a schematic diagram of a first structure of an electrode layer of a touch panel according to an embodiment of the present disclosure.

FIG. 10 is a schematic diagram of the first structure of an electrode layer of a touch panel according to an embodiment of the present disclosure, and as shown in FIG. 10 (for example, the top electrode attached to the bottom substrate layer 50), the touch panel includes an electrode layer. The electrode layer includes: a plurality of conducting regions (for example, the bottom conducting region 51) arranged in parallel and at intervals; a non-conducting region 513 located between adjacent conducting regions, where the non-conducting region includes an edge region 513a close to a conducting region and a central region 513b far from the conducting region, the edge region 513a is adjacent to the central region 513b; a plurality of suspending blocks located in the non-conducting region 513, where cutting grooves 514 are provided between the suspending block close to the conducting region and the conducting region, and between adjacent suspending blocks, and an average width of the cutting grooves located in the edge region 513a (i.e. edge cutting groove 514a) is greater than that of the cutting grooves (i.e. center cutting groove 514b) located in the central region 513b. In a unit area, an area of the cutting groove located in the edge region 513a (i.e. edge cutting groove 514a) is greater than that of the cutting groove located in the central region 514b (i.e. center cutting groove 514b).

Based on the difference in the negative impact of the suspending blocks on the electric field between the conducting regions, as compared with the suspending blocks in the central region having a larger average width and a larger proportion of the cutting groove area, the cutting grooves between the suspending blocks in the edge regions with greater negative impact on the electric field will be adjusted in a small scale to significantly reduce the overall negative impact on the non-conducting region, which effectively increases the number of electric field lines that may be affected by touch operations, and improves the attenuation of the touch effect of the suspending blocks in the electrode layer on the capacitive touch screen. Increasing the number of electric field lines affected by touch operations correspondingly increases the adjustable mutual capacitance value during touch operations, thereby achieving richer design during touch interaction. For example, passive capacitive pens with smaller pen tips may be adapted, and thicker cover plates may also be adapted, which improves the signal-to-noise ratio of touch and improves touch performance under these design requirements. Moreover, the generation of suspending blocks may be achieved by laser-cutting an entire electrode layer attached to the substrate layer, which generates a risk of damaging the substrate layer during the laser cutting process. This solution can reduce the number of laser-cutting times, improve the yield rate of production touch panels, and ultimately achieve cost control.

One of layouts for cutting grooves in the edge region 513a and central region 513b is that the width of some edge cutting grooves 514a is greater than the width of all center cutting grooves 514b, while the width of other edge cutting grooves 514a is less than or equal to the width of some or all center cutting grooves 514b. Another layout for cutting grooves in the edge region 513a and central region 513b is that the width of all edge cutting grooves 514a is greater than that of most center cutting grooves 514b. Regardless of the layout method used, the overall average width of the cutting groove located in the edge region 513a (i.e. edge cutting groove 514a) is maintained to be greater than the average width of the cutting groove located in the central region 513b (i.e. center cutting groove 514b). In a unit area, the area of the cutting groove located in the edge region 513a (i.e. edge cutting groove 514a) is greater than the area of the cutting groove located in the central region 514b (i.e. center cutting groove 514b).

The layouts of the cutting grooves in the edge and central regions may also be designed based on the distribution of suspending blocks. For example, if the number of suspending blocks per unit area is the same in the edge and central regions, and the number of suspending blocks per unit area is the same, the width of the corresponding cutting grooves in the edge region is larger, that is, the width of the cutting grooves in the edge region is greater than those in the central region, which is equivalent to a smaller size of the corresponding suspending block, while the suspending block in the edge region is closer to the electric field line, which has a greater impact on the electric field line. By designing a larger width for the cutting grooves in the edge region, better optimization effects on the penetration of the electric field lines can be achieved as compared with the same adjustment in the central region.

The number of suspending blocks per unit area in the edge and central regions may be set the same as the number of suspending blocks per unit area in related arts, so that as compared with the related arts, the touch effect can be optimized by adjusting the processing parameters (cutting width) of some processing links without increasing the number of processing times. This not only optimizes the touch effect but also avoids a significant increase in production costs, correspondingly, it can improve the yield and production efficiency. Of course, it can also be that the number of suspending blocks per unit area in the edge region is greater than that in the central region, and the proportion of cutting lines is also larger, further reducing the influence of the edge region on the electric field lines.

For the parameters of the cutting groove, the width may be 10 μm-200 μm. For example, the width of the cutting groove may be 10 μm, 15 μm, 30 μm, 65 μm, 98 μm, 120 μm, 150 μm, 185 μm, or 200 μm. It depends on the actual cutting process and product design indicators.

In an embodiment, the area ratio of the edge region to the central region is 4:6~7:3, which can ensure that the proportion of cutting lines in the non-conducting region that has a significant impact on the electric field lines is also relatively large.

Figure 18:
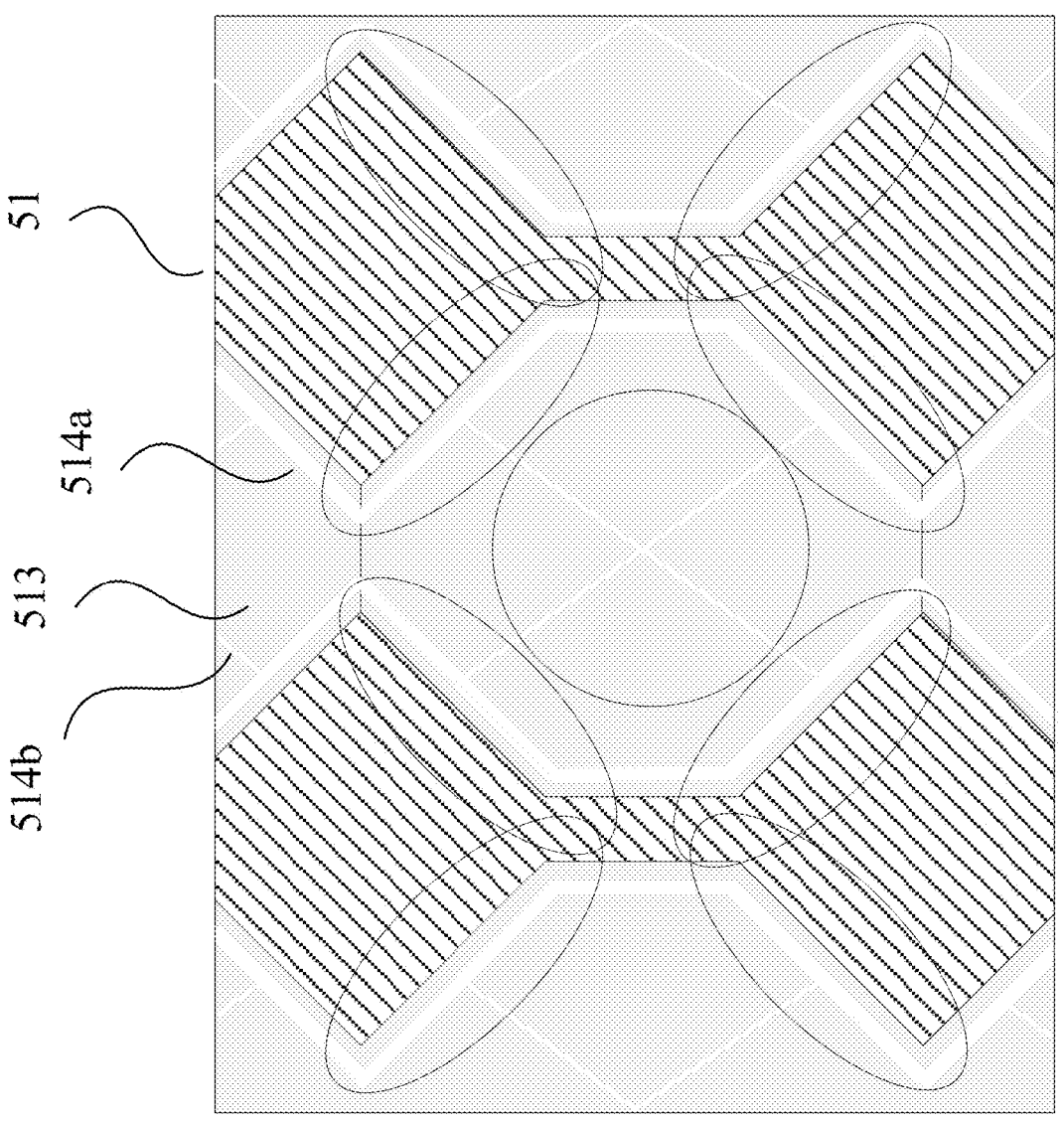
FIG. 18 is a second schematic diagram of an electrode layer of a touch panel according to an embodiment of the present disclosure.

Based on the design in this application, as shown in FIG. 18, with a limited number of cutting lines (edge cutting line 514a and center cutting line 514b), optimizing the distribution of cutting lines can significantly improve the degree of change in the mutual capacitance value between the transmitting electrode and the receiving electrode in contact with the touch object, as long as the limited number of cutting lines is more concentrated in areas with dense electric field lines, or wider cutting lines can be arranged close to the useful conducting region, that is, non-conducting regions are cut by using cutting lines of different widths close to the useful conducting region (edge region of the suspending block) and the central region of the suspending block.

The electrode layer according to this embodiment does not limit its conducting material or the touch panel with a stacked structure. For example, the stacked structure may be: On-cell, FFF, FF, FF2, OGM, OGS, GF2, GFF, GG, GF, etc., all of which may be applicable to the design of the electrode layer in this embodiment.

As shown in FIGS. 10 and 13, each non-conducting region includes a plurality of identical non-conducting sub-regions successively connected along an extension direction of the non-conducting region, and the conducting region includes a plurality of identical conducting sub-regions successively connected along an extension direction of the conducting region. Each non-conducting sub-region is adjacent to two or four conducting sub-regions, and the width of the cutting groove gradually decreases from the edge of the non-conducting sub-region to the center of the non-conducting sub-region. The decreasing manner can be that, for example, from the edge of the non-conducting sub-region to the center of the non-conducting sub-region, the width of the cutting groove successively decreases in equal proportion or equal difference.

Figure 19:
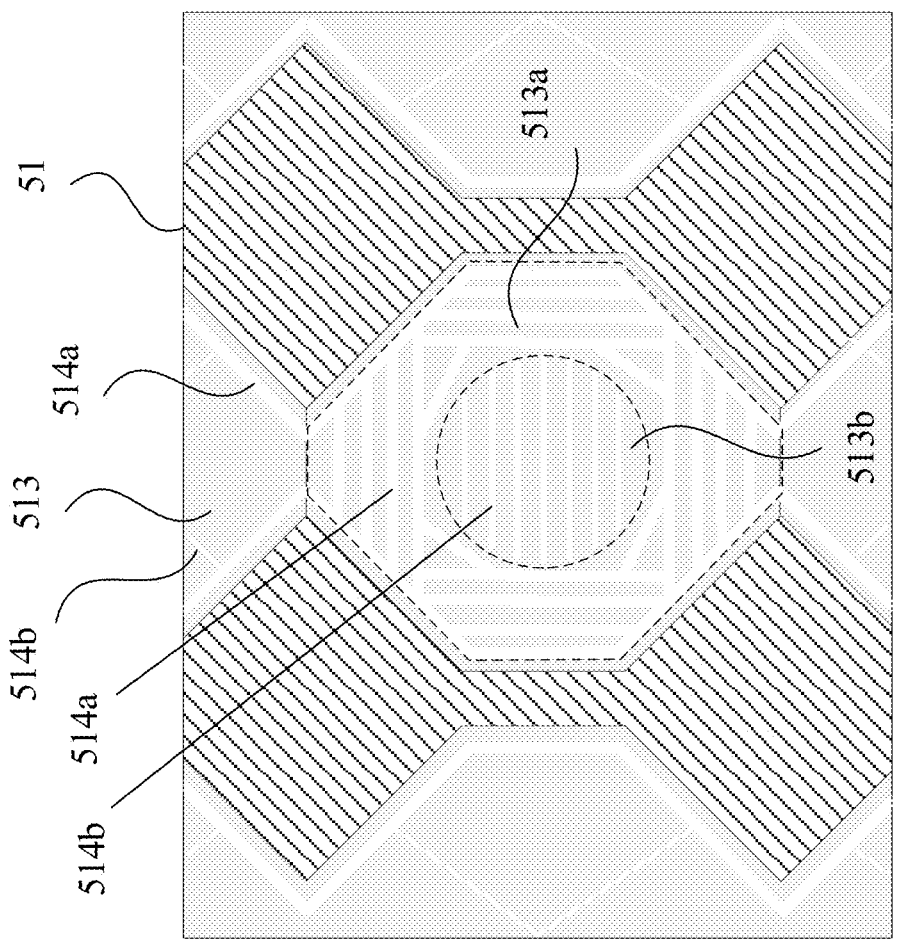
FIG. 19 is a third schematic diagram of an electrode layer of a touch panel according to an embodiment of the present disclosure.

For suspending blocks that approximate planar shapes and cutting grooves that depend on the suspending blocks, shape design may be carried out during some implementation processes. For example, a plurality of the suspending blocks located within each non-conducting sub-region are symmetrically distributed around the center of the non-conducting sub-region, in order to simplify the control of the machining process. Of course, it is also possible not to have a center of symmetry. In some implementations, as shown in FIG. 19, the conducting sub-regions are rectangular, a plurality of conducting sub-regions is successively connected to form a rectangular conducting region. The non-conducting region located between adjacent conducting regions is also rectangular, and the extension line of the cutting groove intersects with the extension line of at least one edge of the adjacent conducting sub-region, that is, the cutting groove is not parallel to the edge of the conducting region. Of course, the cutting groove may also be parallel to the edge of the conducting region. The shape of the electrode block may include, but is not limited to, diamonds and triangles, and the shape of the connecting parts between adjacent electrode blocks is rectangular. It should be noted that components with planar structures such as conducting sub-regions, connecting parts, and electrode blocks have a certain geometric shape, which is not a standard geometric shape, but a quasi-geometric shape. For example, rectangular electrode blocks are connected by rectangular connecting parts, and the connecting part of rectangular electrode blocks may be vertices. After the two are connected, there may not necessarily be two complete rectangles spliced together, and however, in this embodiment, it is still defined as two rectangles.

It should be noted that in FIG. 10, an exemplary implementation based on the bottom electrode attached to the bottom substrate layer 50 is described, and in reality, it may also be based on the top electrode attached to the top substrate layer 30. The implementation based on the top electrode and that based on the bottom electrode are not mutually exclusive. That is, for a touch panel, only one of the bottom electrode or the top electrode may use the implementation of the electrode layer in this scheme, while the other uses a conventional implementation. It is also possible for both to adopt the implementation of the electrode layer in this scheme. If both the top and bottom electrodes adopt the implementation of the electrode layer in this scheme, they may be independently implemented, that is, the implementation details of both within the overall implementation framework of this scheme are not affected by each other. For example, one electrode layer adopts the implementation shown in FIG. 10, and the other electrode layer adopts the implementation shown in FIG. 19. As compared with FIG. 10, the implementation in FIG. 19 has more non-conducting sub-regions per unit area, and the area ratio between the edge region and the central region is also different. In addition to the different implementations between electrode layers, the cutting grooves in non-conducting sub-regions within the same electrode layer are also independently designed. The methods may be the same or different, such as different widths, distribution densities, and variation patterns.

According to this embodiment, another touch panel is further provided, which includes an electrode layer. The electrode layer includes: a plurality of conducting regions arranged in parallel and at intervals; a non-conducting region located between adjacent conducting regions, where the non-conducting region includes an edge region close to a conducting region and a central region far from the conducting region, the edge region is adjacent to the central region; a plurality of suspending blocks located in the non-conducting region, where cutting grooves are provided between the suspending block close to the conducting region and the conducting region, and between adjacent suspending blocks, and an average width of the cutting grooves located in the edge region is greater than that of the cutting grooves located in the central region; and in a unit area, an area of the cutting grooves located in the edge region is greater than that of the cutting grooves located in the central region. The components and macroscopic layout designed in this embodiment are the same as those in the previous embodiment, mainly in terms of changes in the design of the cutting grooves. The overall layout will not be repeated here, and the combination of the suspending block and the cutting groove will be elaborated in detail.

The touch panel in this embodiment has the same overall architecture as the touch panel described above. Under the same overall architecture, the combination of the number of suspending blocks and the width of the cutting grooves has been redesigned. In this embodiment of the present disclosure, the width of the cutting grooves located in the edge region is less than or equal to the width of the cutting grooves located in the central region, The number of suspending blocks per unit area in the edge region is greater than that in the central region, and in a unit area, the area of the cutting grooves located in the edge region is greater than that in the central region. Through this design method, the width of the cutting grooves in the edge region is relatively small but the number is large. Overall, it ensures that the proportion of the area of the cutting grooves located in the edge region to the edge region is greater than the proportion of the area of the cutting grooves located in the central region to the central region. Through small-scale adjustments, the overall negative impact of the non-conducting region on the electric field lines is significantly reduced, which effectively increases the number of electric field lines that may be affected by touch operations, thereby improving the attenuation of the touch effect of the suspending blocks in the electrode layer on the capacitive touch screen. Increasing the number of electric field lines affected by touch operations correspondingly increases the adjustable mutual capacitance value during touch operations, thereby achieving richer design during touch interaction. For example, passive capacitive pens with smaller pen tips may be adapted, and thicker cover plates may also be adapted, which improves the signal-to-noise ratio of touch and improve touch performance under these design requirements. At this point, the width of a single cutting groove in the edge region can also be controlled, which avoids significant optical effect differences in the edge region.

For the parameters of the cutting groove, the width may be 10 μm-200 μm. For example, the width of the cutting groove may be 10 μm, 15 μm, 30 μm, 65 μm, 98 μm, 120 μm, 150 μm, 185 μm, or 200 μm. It depends on the actual cutting process and product design indicators.

In an implementation, the area ratio of the edge region to the central region is 4:6~7:3, which can ensure that the area proportion of the cutting lines in the non-conducting region that has a significant impact on the electric field line is also relatively large.

The electrode layer according to this embodiment does not limit its conducting material or the touch panel with a stacked structure. For example, the stacked structure may be: On-cell, FFF, FF, FF2, OGM, OGS, GF2, GFF, GG, GF, etc., all of which can be applicable to the design of the electrode layer in this embodiment.

For the touch panel in this embodiment, each non-conducting region includes a plurality of identical non-conducting sub-regions successively connected along the extension direction of the non-conducting region, and the conducting region includes a plurality of identical conducting sub-regions successively connected along the extension direction of the conducting region. Each non-conducting sub-region is adjacent to two or four conducting sub-regions, and the width of the cutting grooves in the edge region are the same; or, in the direction from the edge of the non-conducting sub-region to the center of the non-conducting sub-region, the width of the cutting grooves in the edge region gradually decreases. The width of the cutting grooves in the edge region gradually decreases, such as successively decreasing in equal proportion or equal difference.

For suspending blocks that approximate planar shapes and cutting grooves that depend on the suspending blocks, shape design may be carried out during the implementation processes. For example, a plurality of suspending blocks located within each non-conducting sub-region are symmetrically distributed around the center of the non-conducting sub-region, in order to simplify the control of the machining process. Of course, it is also possible not to have a center of symmetry. The conducting sub-region, for example, is rectangular in shape, and a plurality of conducting sub-regions is successively connected to form a conducting region of a strip. The non-conducting region located between adjacent conducting regions also forms a strip, and the extension line of the cutting groove intersects with the extension line of at least one edge of the adjacent conducting sub-region, that is, the edge of the cutting groove and the conducting region are not parallel. Of course, the cutting groove may also be parallel to the edge of the conducting region. The shape of the electrode block may include, but is not limited to, diamonds and triangles, and the shape of the connecting parts between adjacent electrode blocks is rectangular.

In this embodiment of the present disclosure, the design of the suspending block and cutting groove in the touch panel may be based on the bottom electrode or the top electrode, and the implementation based on the top electrode and that based on the bottom electrode are not mutually exclusive. That is, for a touch panel, only one of the bottom electrode or the top electrode may be implemented by using the electrode layer implementation in this scheme, and the other may be implemented by using the implementation shown in FIG. 1. It is also possible for both to adopt the implementation of the electrode layer in this scheme. If both the top electrode and the bottom electrode adopt the implementation of the electrode layer in this scheme, they may be independently implemented, that is, their implementation details within the overall implementation framework of this scheme are not affected by each other, and even the top electrode and the bottom electrode may each adopt the implementation according to any embodiment of the present disclosure. In addition to the different implementations between electrode layers, the cutting grooves in non-conducting sub-regions within the same electrode layer are also independently designed. The methods may be the same or different, such as different widths, distribution densities, and variation patterns.

In this embodiment, another touch panel is provided, which includes an electrode layer. The electrode layer includes: a plurality of conducting regions arranged in parallel and at intervals; a non-conducting region located between adjacent conducting regions, where the non-conducting region includes an edge region close to a conducting region and a central region far from the conducting region, the edge region is adjacent to the central region; a plurality of suspending blocks located in the non-conducting region, where cutting grooves are provided between the suspending block close to the conducting region and the conducting region, and between adjacent suspending blocks, and an average width of the cutting grooves located in the edge region is greater than that of the cutting grooves located in the central region. In this embodiment, the main purpose is to redesign the width of the cutting grooves in the edge region, and through small-scale adjustments, the overall negative impact of the non-conducting region on the electric field lines is significantly reduced, the number of electric field lines that can be affected by touch operations effectively increased, and the attenuation of the touch effect of the suspending blocks in the electrode layer on the capacitive touch screen is improved. Increasing the number of electric field lines affected by touch operations correspondingly increases the adjustable mutual capacitance value during touch operations, thereby achieving richer design during touch interaction. In an implementation, if a larger width has already been designed for the cutting grooves in the edge region, the number of cutting grooves in the edge region may be further controlled, that is, the density of cutting grooves in the edge region is less than or equal to the density of cutting grooves in the central region. Correspondingly, by using relatively small but wider cutting grooves, the overall negative impact of the non-conducting region on the electric field line may be weakened, which effectively increases the number of electric field lines that can be affected by touch operations, thereby improving the attenuation of the touch effect of the suspending blocks in the electrode layer on the capacitive touch screen.

One of layouts for cutting grooves in the edge region (corresponding to edge cutting grooves) and central region (corresponding to center cutting grooves) is that the width of some edge cutting grooves is greater than the width of all center cutting grooves, and the width of other edge cutting grooves is less than or equal to the width of some or all center cutting grooves. Another optional layout for cutting grooves in the edge and central regions is that the width of all edge cutting grooves is greater than that of most center cutting grooves. Regardless of the layout method used, the overall average width of the cutting grooves located in the edge region (i.e. edge cutting groove) is maintained to be greater than the average width of the cutting groove located in the central region (i.e. center cutting groove). In a unit area, the area of the cutting grooves located in the edge region (i.e. edge cutting groove) is greater than the area of the cutting grooves located in the central region (i.e. center cutting groove).

The layout of the cutting grooves in the edge and central regions may also be designed based on the distribution of suspending blocks. For example, if the number of suspending blocks per unit area is the same in the edge and central regions, and the number of suspending blocks per unit area is the same, the width of the corresponding cutting grooves in the edge region is larger, that is, the width of the cutting grooves in the edge region is greater than that in the central region, which is equivalent to a smaller size of the corresponding suspending block, while the suspending block in the edge region is closer to the electric field line, which has a greater impact on the electric field line. By designing a larger width for the cutting groove in the edge region, better optimization results can be achieved as compared with the same adjustment in the central region.

The number of suspending blocks per unit area in the edge and central regions may be set to be the same as the number of suspending blocks per unit area in related arts, so that as compared with the related arts, the touch effect can be optimized by adjusting the processing parameters (cutting width) of some processing links without increasing the number of processing times. This not only optimizes the touch effect, but also avoids a significant increase in production costs, correspondingly, it can improve the yield and production efficiency. Of course, it can also be that the number of suspending blocks per unit area in the edge region is greater than that in the central region, and the proportion of cutting lines is also larger, further reducing the influence of the edge region on the electric field lines.

For the parameters of the cutting groove, the width can be 10 μm-200 μm. For example, the width of the cutting groove may be 10 μm, 15 μm, 30 μm, 65 μm, 98 μm, 120 μm, 150 μm, 185 μm, or 200 μm. It depends on the actual cutting process and product design indicators.

In an implementation, the area ratio of the edge region to the central region is 4:6~7:3, which can ensure that the proportion of cutting lines in the non-conducting region that has a significant impact on the electric field lines is also relatively large.

Based on the design in this application, with a limited number of cutting lines, optimizing the distribution of cutting lines (including edge cutting lines and center cutting lines) can significantly improve the degree of change in the mutual capacitance value between the transmitting electrode and the receiving electrode in contact with the touch object, as long as the limited number of cutting lines is more concentrated in areas with dense electric field lines, or wider cutting lines can be arranged close to the useful conducting region, that is, non-conducting regions are cut by using cutting lines of different widths close to the useful conducting region (edge region of the suspending block) and the central region of the suspending block.

The electrode layer according to this embodiment does not limit its conducting material or the touch panel with a stacked structure. For example, the stacked structure can be: On-cell, FFF, FF, FF2, OGM, OGS, GF2, GFF, GG, GF, etc., all of which may be applicable to the design of the electrode layer in this embodiment.

Each non-conducting region includes a plurality of identical non-conducting sub-regions successively connected along the extension direction of the non-conducting region, and the conducting region includes a plurality of identical conducting sub-regions that are successively connected along the extension direction of the conducting region. Each non-conducting sub-region is adjacent to two or four conducting sub-regions, and the width of the cutting groove gradually decreases from the edge of the non-conducting sub-region to the center of the non-conducting sub-region. The decreasing manner can be that, for example, from the edge of the non-conducting sub-region to the center of the non-conducting sub-region, the width of the cutting groove successively decreases in equal proportion or equal difference.

For suspending blocks that approximate planar shapes and cutting grooves that depend on the suspending blocks, shape design may be carried out during some implementation processes. For example, a plurality of suspending blocks located within each non-conducting sub-region are symmetrically distributed around the center of the non-conducting sub-region, in order to simplify the control of the machining process. Of course, it is also possible not to have a center of symmetry. In some implementations, the conducting sub-regions are rectangular in shape, a plurality of conducting sub-regions is successively connected to form a rectangular conducting region. The non-conducting region located between adjacent conducting regions is also rectangular, and the extension line of the cutting groove intersects with the extension line of at least one edge of the adjacent conducting sub-region, that is, the edge of the cutting groove is not parallel to the edge of the conducting region. Of course, the cutting groove may also be parallel to the edge of the conducting region. The shape of the electrode block may include, but is not limited to, diamonds and triangles, and the shape of the connecting parts between adjacent electrode blocks is rectangular.

It should be noted that the design of suspending blocks and cutting grooves in the touch panel may be based on the bottom electrode or the top electrode, and the implementation based on the top electrode and that based on the bottom electrode are not mutually exclusive. That is, for a touch panel, only one of the bottom electrode or top electrode may be implemented by using the electrode layer in this scheme, and the other may be implemented by using the implementation as shown in FIG. 1. It is also possible for both to adopt the implementation of the electrode layer in this scheme. If both the top electrode and the bottom electrode adopt the implementation of the electrode layer in this scheme, they may be independently implemented, that is, their implementation details within the overall implementation framework of this scheme are not affected by each other, and even the top electrode and the bottom electrode may each adopt the implementation according to any embodiment of the present disclosure. In addition to the different implementations between electrode layers, the cutting grooves in non-conducting sub-regions within the same electrode layer are also independently designed. The methods may be the same or different, such as different widths, distribution densities, and variation patterns.

For the conducting and non-conducting regions, they are both planar structures formed by using the same material. In this scheme, different filling methods are used to represent the suspending blocks in the conducting and non-conducting regions, only to distinguish their distribution regions, and not to indicate their interlayer relationship or material differences.

According to this embodiment, a touch display device is provided, which includes the above-mentioned touch panel. The touch display device has all the advantages of the touch panel and will not be repeated here. The touch display device includes, but is not limited to, a flat-panel touch display device, a curved-panel touch display device, and a foldable-panel touch display device.

It should also be noted that the terms "including," "comprising," or any other variant thereof are intended to encompass non-exclusive inclusion, such that a process, method, commodity, or equipment that includes a series of elements not only includes those elements, but also other elements that are not explicitly listed, or also include elements inherent to such a process, method, commodity, or equipment. Without further limitations, the elements limited by the statement "including one . . . " do not exclude the existence of other identical elements in the process, method, commodity, or device that includes the elements.

Those skilled in the art will understand that the present disclosure is not limited to the enumerated embodiments, and can undergo various obvious changes, readjustments, and replacements without departing from the scope of protection of the present disclosure. Therefore, although the present disclosure has been described in detail through the above embodiments, it is not limited to the above embodiments. Without departing from the concept of the present disclosure, it may also include more equivalent embodiments, and the scope of the present disclosure is determined by the scope of the accompanying claims.

What is claimed is:

1. A touch panel comprising an electrode layer, wherein the electrode layer comprises:

a plurality of conducting regions arranged in parallel and at intervals;

a non-conducting region located between adjacent conducting regions, wherein the non-conducting region comprises an edge region that is close to a first conducting region of the plurality of conducting regions and a central region that is away from the first conducting region, and the edge region is adjacent to the central region; and a plurality of suspending blocks located in the non-conducting region, wherein cutting grooves are provided between a first suspending block of the plurality of suspending blocks that is close to the first conducting region and the first conducting region, and between adjacent suspending blocks, and a density of the cutting grooves located in the edge region is greater than that of the cutting grooves located in the central region.

2. The touch panel of claim 1, wherein:
the non-conducting region comprises a plurality of identical non-conducting sub-regions successively connected along an extension direction of the non-conducting region;
one of the plurality of conducting regions comprises a plurality of identical conducting sub-regions successively connected along an extension direction of the plurality of conducting regions;
one of the plurality of non-conducting sub-regions is surrounded by a first conducting sub-region of the plurality of conducting sub-regions in a third conducting region and a second conducting sub-region of the plurality of conducting sub-regions in a fourth conducting region adjacent to the third conducting region; and
a spacing between adjacent cutting grooves gradually increases from an edge of the one of the plurality of non-conducting sub-regions to a center of the one of the plurality of non-conducting sub-regions.

3. The touch panel of claim 2, wherein from the edge of the one of the plurality of non-conducting sub-regions to the center of the one of the plurality of non-conducting sub-regions, the spacing between adjacent cutting grooves is successively enlarged in equal proportion or equal difference.

4. The touch panel of claim 2, wherein the cutting grooves are parallel to at least one edge of the plurality of conducting sub-regions.

5. The touch panel of claim 4, wherein:
the plurality of conducting sub-regions comprises an electrode block and a connecting part, and a direction from the electrode block to the connecting part is parallel to an extension direction of the plurality of conducting regions, and the electrode blocks in two adjacent conducting sub-regions are connected through the connecting part, the cutting grooves are parallel to an edge of the electrode block, and the electrode block comprises a rhombus-shaped electrode block or a right-angled triangle electrode block; or
the plurality of conducting sub-regions are rectangular, and the plurality of conducting regions and the non-conducting region are strip-shaped, and the cutting grooves are parallel to edges of the plurality of conducting regions.

6. The touch panel of claim 2, wherein the plurality of the suspending blocks located in each of the plurality of non-conducting sub-regions are symmetrically distributed with respect to a center of the each of the plurality of non-conducting sub-regions.

7. The touch panel of claim 1, wherein one of the cutting grooves has a width of 20 μm-60 μm.

8. The touch panel of claim 1, wherein the electrode layer comprises at least one of a top electrode or a bottom electrode, and
wherein, if the top electrode exists, the top electrode is close to a touch-sensitive surface and, if the bottom electrode exists, the bottom electrode faces away from the touch-sensitive surface.

9. The touch panel of claim 8, further comprising:
a display module located on a side of the bottom electrode away from the top electrode,
wherein an edge portion of the touch panel is located on a periphery of a central portion of the touch panel, the edge portion is adjacent to the central portion, and a density of the cutting grooves of the bottom electrode located in the edge portion of the touch panel is smaller than that of the cutting grooves of the bottom electrode located in the central portion of the touch panel.

10. The touch panel of claim 8, further comprising:
a display module located on a side of the bottom electrode away from the top electrode,
wherein an edge portion of the touch panel is located on a periphery of a central portion of the touch panel,
the edge portion is adjacent to the central portion, the bottom electrode is a sensing electrode layer,
a density of the cutting grooves of the bottom electrode located in the edge portion of the touch panel is smaller than that of the cutting grooves of the top electrode located in the edge portion of the touch panel, and
the density of the cutting grooves of the bottom electrode located in the central portion of the touch panel is less than that of the cutting grooves of the top electrode located in the central portion of the touch panel.

11. A touch panel comprising: an electrode layer, wherein the electrode layer comprises:
a plurality of conducting regions arranged in parallel and at intervals;
a non-conducting region located between adjacent conducting regions, wherein the non-conducting region comprises an edge region that is close to a first conducting region of the plurality of conducting regions and a central region that is away from the first conducting region, and the edge region is adjacent to the central region; and
a plurality of suspending blocks located in the non-conducting region, wherein cutting grooves are provided between a first suspending block of the plurality of suspending blocks that is close to the first conducting region and the first conducting region, and between adjacent suspending blocks,
wherein an average width of the cutting grooves located in the edge region is greater than that of the cutting grooves located in the central region, and
wherein in a unit area, an area of the cutting groove located in the edge region is greater than that of the cutting groove located in the central region.

12. The touch panel of claim 11, wherein the number of suspending blocks per unit area in the edge region is same as that in the central region, and the average width of the cutting grooves located in the edge region is greater than that of the cutting grooves located in the central region.

13. The touch panel of claim 12, wherein:
the non-conducting region comprises a plurality of identical non-conducting sub-regions successively connected along an extension direction of the non-conducting region;
one of the plurality of conducting regions comprises a plurality of identical conducting sub-regions successively connected along the extension direction of the plurality of conducting regions;
one of the plurality of non-conducting sub-regions is adjacent to two or four conducting sub-regions; and
the average width of the cutting grooves gradually decreases from an edge of one of the plurality of the non-conducting sub-regions to a center of the one of plurality of the non-conducting sub-regions.

14. The touch panel of claim 13, wherein from the edge of the one of plurality of the non-conducting sub-regions to the center of the one of plurality of the non-conducting sub-regions, the average width of the cutting grooves successively decreases in equal proportion or equal difference.

15. The touch panel of claim 13, wherein an extension line of the cutting grooves intersects with an extension line of at least one edge of the adjacent conducting sub-regions.

16. The touch panel of claim 13, wherein the plurality of suspending blocks located within each of the plurality of non-conducting sub-regions are symmetrically distributed around the center of the one of the plurality of non-conducting sub-regions.

17. The touch panel of claim 11, wherein one of the cutting grooves has a width of 10 μm-200 μm.

18. The touch panel of claim 11, wherein the electrode layer comprises at least one of a top electrode or a bottom electrode, and wherein, if the top electrode exists, the top electrode is close to a touch-sensitive surface and, if the bottom electrode exists, the bottom electrode faces away from the touch-sensitive surface.

19. The touch panel of claim 18, wherein an arrangement of the cutting grooves for the top electrode and that for the bottom electrode are different, or an arrangement of the cutting grooves for different non-conducting sub-regions are different.

20. The touch panel of claim 11, wherein an area ratio of the edge region to the central region is 4:6~7:3.

* * * * *